(12) United States Patent
Slobodyanyuk et al.

(10) Patent No.: US 10,197,676 B2
(45) Date of Patent: Feb. 5, 2019

(54) SOLID-STATE ELECTRONIC LIGHT DETECTION AND RANGING (LIDAR)

(71) Applicant: QUALCOMM Incorporated, San Diego, CA (US)

(72) Inventors: Volodimir Slobodyanyuk, San Diego, CA (US); Richard George Martin, San Diego, CA (US); Donald Bolden Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 14/698,169

(22) Filed: Apr. 28, 2015

(65) Prior Publication Data
US 2016/0320488 A1  Nov. 3, 2016

(51) Int. Cl.
| | | |
|---|---|---|
| *G01C 3/08* | (2006.01) | |
| *G01S 17/42* | (2006.01) | |
| *G01S 7/481* | (2006.01) | |
| *G02B 26/08* | (2006.01) | |
| *G02B 26/10* | (2006.01) | |

(52) U.S. Cl.
CPC ............ *G01S 17/42* (2013.01); *G01S 7/4817* (2013.01); *G02B 26/0808* (2013.01); *G02B 26/106* (2013.01)

(58) Field of Classification Search
CPC ... G01S 17/42; G01S 7/4817; G02B 26/0808; G02B 26/106
See application file for complete search history.

(56) References Cited

U.S. PATENT DOCUMENTS

| | | | | |
|---|---|---|---|---|
| 4,631,416 A | * | 12/1986 | Trutna, Jr. ............ | G03F 9/7049 250/237 G |
| 6,233,044 B1 | * | 5/2001 | Brueck ................. | G03F 7/2022 355/67 |
| 7,532,311 B2 | | 5/2009 | Henderson et al. | |

(Continued)

FOREIGN PATENT DOCUMENTS

| | | |
|---|---|---|
| DE | 102013215627 A1 | 2/2015 |
| EP | 2428830 A1 | 3/2012 |

(Continued)

OTHER PUBLICATIONS

Second Written Opinion for PCT/US2016/024574, dated May 2, 2017, 10 pages.

(Continued)

*Primary Examiner* — Samantha K Abraham
(74) *Attorney, Agent, or Firm* — Withrow & Terranova, PLLC

(57) ABSTRACT

Solid-state electronic light detection and ranging (LIDAR) is disclosed. In one aspect, an electronic device for use in a LIDAR system is provided. The electronic device includes a plurality of electrically controllable light-direction-changing elements. The electronic device is configured to receive, from a laser, a beam of light. The electronic device also receives, from a controller, a series of signals that control the electrically controllable light-direction-changing elements to generate a successive series of different diffraction grating patterns configured to move at least one intensity maxima to a corresponding successive series of locations across a field of view (FOV).

13 Claims, 17 Drawing Sheets

(56) References Cited

U.S. PATENT DOCUMENTS

| | | |
|---|---|---|
| 7,791,786 B2 | 9/2010 | Kane et al. |
| 8,203,703 B1 | 6/2012 | Kane et al. |
| 2006/0066641 A1 | 3/2006 | Gally et al. |

FOREIGN PATENT DOCUMENTS

| | | |
|---|---|---|
| WO | 2006076474 A1 | 7/2006 |
| WO | 2012034881 A1 | 3/2012 |

OTHER PUBLICATIONS

Author Unknown, "LAMDA—Large Aperture MEMs Scanner Module for 3D Distance Measurement," Fraunhofer Institute for Photonic Microsystems IPMS, retrieved Jun. 2, 2014 from http://www.ipms.fraunhofer.de/content/dam/ipms/common/products/AMS/lamda-e.pdf, 2 pages.

McManamon, P. et al., "A Review of Phased Array Steering for Narrow-Band Electrooptical Systems," Proceedings of the IEEE, vol. 97, Issue 6, Jun. 2009, IEEE, pp. 1078-1096.

Sudharsanan, R. et al., "Low Cost Scanning LiDAR Imager Shows promise for autonomous vehicle mapping applications," LiDAR Magazine, vol. 3, No. 2, Mar. 24, 2013, Spatial Media, 4 pages.

Yang, W. et al., "High-Speed Optical Phased Array Using High-Contrast Grating All-Pass Filters," 2012 International Conference on Indium Phosphide and Related Materials (IPRM), Aug. 27-30, 2012, Santa Barbara, CA, IEEE, pp. 22-24.

International Preliminary Report on Patentability for PCT/US2016/024574, dated Jul. 28, 2017, 26 pages.

International Search Report and Written Opinion for PCT/US2016/024574, dated Nov. 9, 2016, 14 pages.

\* cited by examiner

SOLID-STATE ELECTRONIC LIGHT DETECTION AND RANGING (LIDAR)

BACKGROUND

I. Field of the Disclosure

The technology of the disclosure relates generally to light detection and ranging (LIDAR) technology, and in particular to solid-state LIDAR technology.

II. Background

Light detection and ranging (LIDAR) technology uses ultraviolet, visible, or near-infrared light to image objects. LIDAR is useful in a wide variety of applications, including, for example, the generation of topographical maps, mapping features beneath forest canopy, obstacle detection and avoidance, and atmospheric remote sensing.

Generally, LIDAR operates based on a known orientation of a laser beam and a detected reflection of the laser beam. Many LIDAR systems utilize a laser beam that is actively moved across a field of view (FOV). Relatively complex mechanical subsystems that utilize rotating and/or tilting mirrors are often used to move the laser beam across the FOV. Such mechanical subsystems are relatively large, and the accuracy of the LIDAR system is in large part dependent on the accuracy of the mechanical subsystem. Consequently, such mechanical subsystems are built to relatively high tolerances, which increases cost and, in operation, such mechanical subsystems are susceptible to vibrations or other environmental forces. Moreover, the scanning speed of the laser beam is limited by the inertia of the mechanical subsystem. Such mechanical subsystems also have relatively high power requirements.

Other LIDAR systems utilize a relatively complex arrangement of beam-splitting prisms and mirrors. Such systems limit the ability to alter the configuration of a light beam, and splitting the light beam results in a relatively low energy light beam that may be unsuitable for many environments.

Relatively large, expensive, and/or low-powered LIDAR systems are unsuitable for many applications in which LIDAR could otherwise provide substantial benefits.

SUMMARY OF THE DISCLOSURE

Aspects disclosed in the detailed description include a solid-state electronic light detection and ranging (LIDAR) system and associated methods and apparatus. The LIDAR system utilizes an electronic device which, responsive to signals emitted from a controller, is configured to generate a successive series of different diffraction grating patterns. The electronic device receives a laser beam from a laser and forms an intensity maxima. The direction of the intensity maxima differs with each different diffraction pattern generated by the electronic device. The intensity maxima may reflect off an object surface and be detected by a receiver. The controller, based on an orientation of the intensity maxima and the time of flight of the reflected light, can determine a location and a distance of the object surface.

In this regard, in one aspect, an electronic device for use in a LIDAR system is provided. The electronic device includes a plurality of electrically controllable light-direction-changing elements. The electronic device is configured to receive a beam of light from a laser. The electronic device is also configured to receive, from a controller, a series of signals that control the plurality of electrically controllable light-direction-changing elements to generate a successive series of different diffraction grating patterns configured to move at least one intensity maxima to a corresponding successive series of locations across a field of view (FOV).

In another aspect, a LIDAR system for detecting a surface of an object is provided. The LIDAR system includes a laser that is configured to emit a beam of light along a path. The LIDAR system also includes a device comprising a plurality of electrically controllable light-direction-changing elements disposed in the path. A controller is communicatively coupled to the device and is configured to control the plurality of electrically controllable light-direction-changing elements to generate a successive series of different diffraction grating patterns configured to move at least one intensity maxima to a corresponding successive series of locations across an FOV. The LIDAR system includes a receiver that is configured to detect a reflection of the at least one intensity maxima from an object surface. The controller is further configured to determine a distance and a relative location of the object surface based on the reflection.

In another aspect, a LIDAR system for detecting a surface of an object is provided. The LIDAR system includes a means for emitting a beam of light along a path. The system further includes a means for controlling a device disposed in the path and comprising a plurality of electrically controllable light-direction-changing elements to generate a successive series of different diffraction grating patterns configured to move at least one intensity maxima to a corresponding successive series of locations across an FOV. The LIDAR system further includes a means for detecting a reflection of the at least one intensity maxima from an object surface. The LIDAR system includes a means for determining a distance and a relative location of the object surface based on the reflection.

In another aspect, a method of controlling movement of an intensity maxima in a LIDAR system is provided. The method includes emitting a beam of light along a path. The method also includes controlling a device comprising a plurality of electrically controllable light-direction-changing elements disposed in the path to generate a successive series of different diffraction grating patterns configured to move at least one intensity maxima to a corresponding successive series of locations across an FOV. The method further includes detecting a reflection of the at least one intensity maxima from an object surface and determining a distance and a relative location of the object surface based on the reflection.

DETAILED DESCRIPTION

Figure 1:
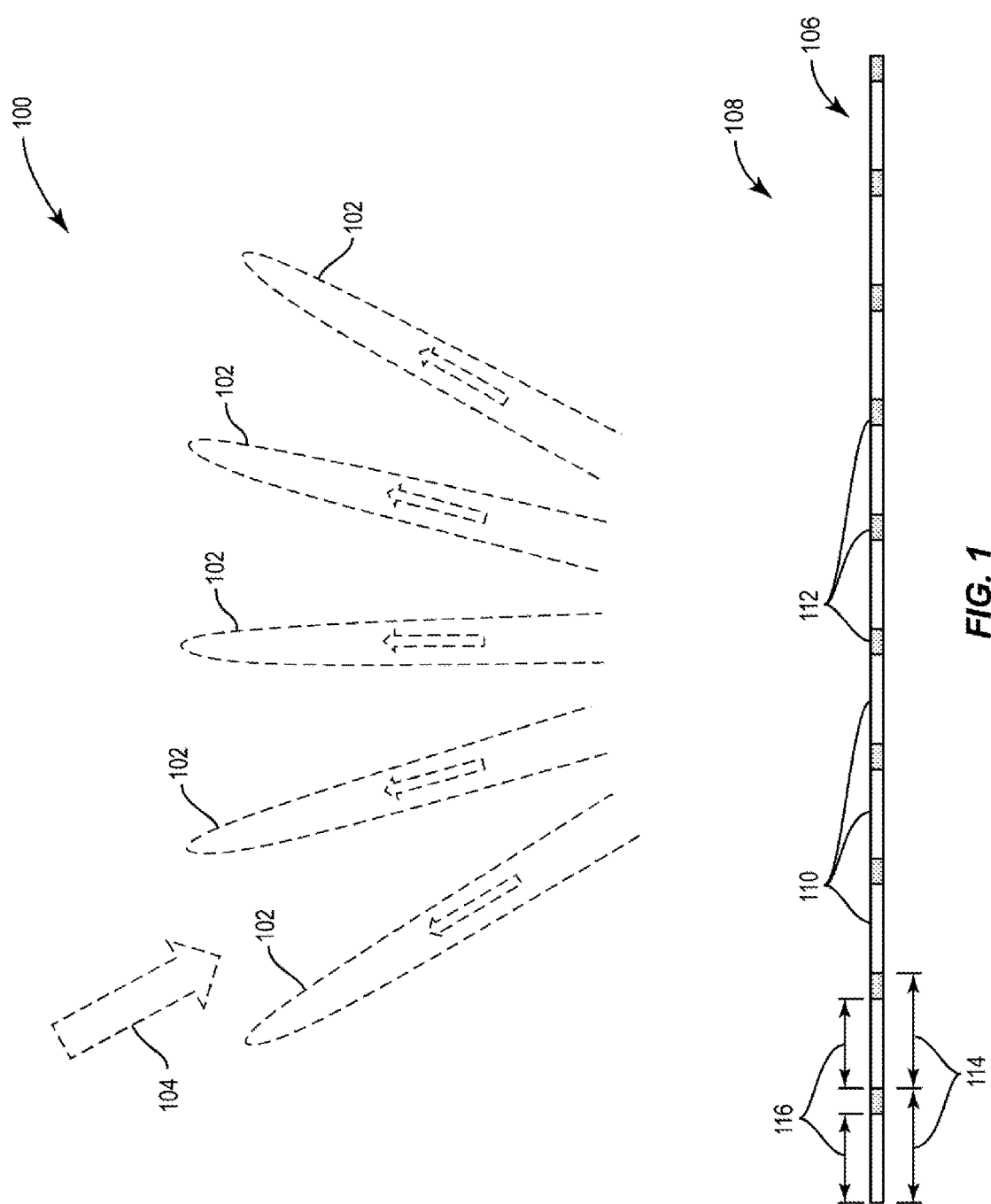
FIG. 1 is a block diagram illustrating exemplary intensity maximas formed in response to a laser beam impinging upon a surface of a diffraction grating.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. Any flowcharts discussed herein are necessarily discussed in some sequence for purposes of illustration, but unless otherwise explicitly indicated, the aspects are not limited to any particular sequence of steps. The phrase "light-direction-changing element" refers to an element that has the ability to change a direction of light that is incident upon the element, either by reflection, refraction, or diffraction.

Aspects disclosed in the detailed description include a solid-state electronic light detection and ranging (LIDAR) system and associated methods and apparatus. The LIDAR system utilizes an electronic device that comprises a plurality of electrically controllable light-direction-changing elements. The electrically controllable light-direction-changing elements, responsive to signals emitted from a controller, are controlled to generate a successive series of different diffraction grating patterns. The electronic device receives a laser beam from a laser and forms an intensity maxima. The direction of the intensity maxima differs with each different diffraction pattern generated by the electronic device. The intensity maxima may reflect off an object surface and be detected by a receiver. The controller, based on an orientation of the intensity maxima and the time of flight of the reflected light, can determine a location and a distance of the object surface.

Figure 3:
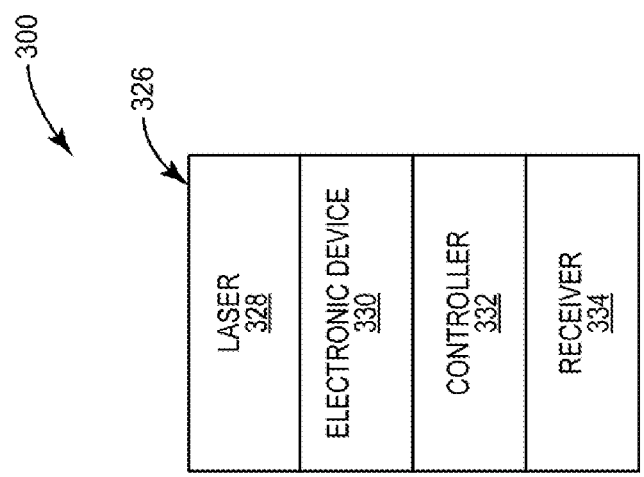
FIG. 3 is a block diagram of an exemplary light detection and ranging (LIDAR) system that electronically controls light-direction-changing elements to move an intensity maxima across a field of view (FOV) according to one aspect.

Before discussing examples of solid-state LIDAR systems that include an electronic device that comprises a plurality of electrically controllable light-direction-changing elements starting at FIG. 3, a short discussion of the characteristics of diffraction gratings may be useful to an understanding of the aspects. In this regard, FIG. 1 is a block diagram 100 illustrating a plurality of exemplary orders m of intensity maximas 102 formed in response to a laser beam 104 impinging upon a surface of a diffraction grating 106. Each intensity maxima 102 represents a particular order m of diffraction, wherein m=0, ±1, ±2, . . . . The diffraction grating 106 has a pattern 108 that comprises a plurality of reflective surfaces 110 (only some labeled for purposes of illustration) and a plurality of non-reflective surfaces 112 (only some labeled for purposes of illustration). Each reflective surface 110 is spaced a constant same distance 114 from an adjacent reflective surface 110. Each reflective surface 110 also has a same width 116. Each reflective surface 110 acts as a point source of light, and thus multiple light waves propagate in response to the laser beam 104 being incident on the diffraction grating 106. The multiple light waves overlap during propagation resulting in areas of destructive interference and areas of constructive interference. Each intensity maxima 102 comprises a beam of light formed from constructive interference of propagating light waves. The areas in between the intensity maximas 102 represent areas of destructive interference and thus comprise "nulls" where little or no light propagates.

Other than an order m=0 intensity maxima 102, the particular orientation of the intensity maximas 102 are based, in part, on the distance 114 between the reflective surfaces 110 and the width 116 of the reflective surfaces 110. In other words, if the distance 114 between the reflective surfaces 110 and/or the width 116 of the reflective surfaces 110 were altered from that illustrated in FIG. 1, the orientation of the intensity maximas 102 that represent orders m=±1, ±2, . . . would differ. Order m=0 is the intensity maxima 102 generated by direct reflection of the laser beam 104 and is thus not affected by the distance 114 between the reflective surfaces 110 and/or the width 116 of the reflective surfaces 110.

Figure 2:
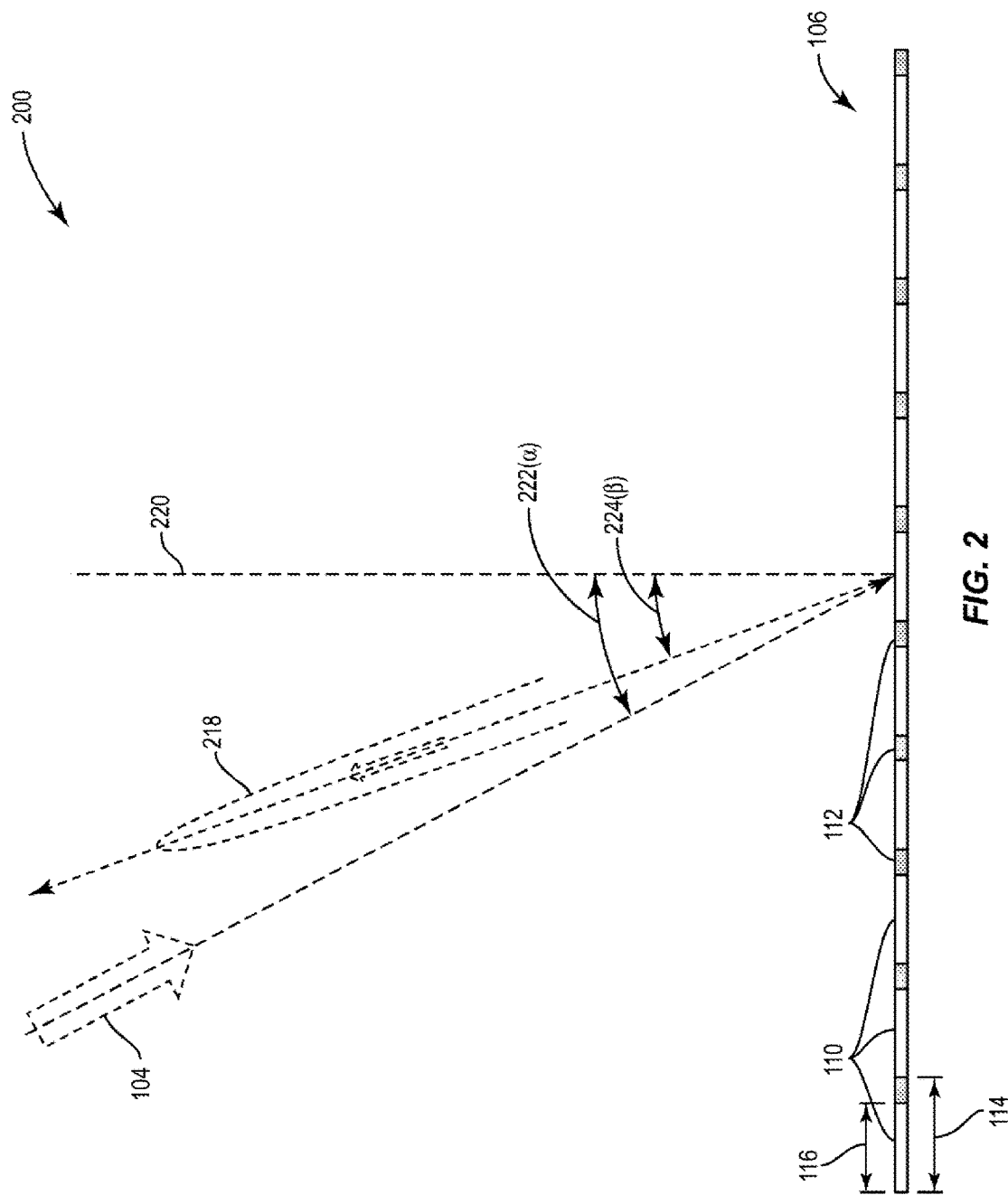
FIG. 2 is a block diagram illustrating the diffraction grating illustrated in FIG. 1, and angular displacement of the laser beam and an intensity maxima with respect to a surface normal.

FIG. 2 is a block diagram 200 illustrating the diffraction grating 106 illustrated in FIG. 1 and angular displacement of the laser beam 104 and an intensity maxima 218 with respect to a surface normal 220. For purposes of illustration, only a single intensity maxima 218 is illustrated, but there may be a plurality of orders m of intensity maximas 218 in practice. An angle 222 may sometimes be referred to herein as α and represents the angle between the incident laser beam 104 and the surface normal 220. An angle 224 may sometimes be referred to herein as β and represents the angle between the intensity maxima 218 and the surface normal 220. The angle 224 may be determined in accordance with the following grating equations:

$$d(\sin \alpha + \sin \beta) = m\lambda$$

$$\sin \alpha + \sin \beta = Nm\lambda$$

where:
d is the distance 114 between the reflective surfaces 110 (sometimes referred to as the grating period),
α is the angle (angle 222) between the incident laser beam 104 and the surface normal 220,
β is the angle (angle 224) between the intensity maxima 218 and the surface normal 220,
N is the number of reflective surfaces 110 per millimeter (sometimes referred to as the groove density),
m is the particular order of diffraction (e.g., m=0, ±1, ±2, . . . ), and
λ is the wavelength of the laser beam 104.

Accordingly, given a known wavelength of the laser beam 104, the angle 222 of incidence of the laser beam 104 with respect to the surface normal 220, the distance 114 between the reflective surfaces 110, and the width 116 of the reflective surfaces 110, the precise angle 224 of a particular order m of the intensity maxima 218 with respect to the surface normal 220 may be determined in accordance with the grating equations above.

FIG. 3 is a block diagram 300 of a system 326 according to one aspect. The system 326 includes a laser 328 that is configured to emit a beam of light, such as a laser beam, along a path. The laser 328 may emit light in any desired wavelength, including, by way of non-limiting example, an infrared wavelength, a visible light wavelength, or an ultraviolet wavelength. The system 326 also includes an electronic device 330 that includes a plurality of individually electrically controllable light-direction-changing elements disposed in the path of the beam of light. In some aspects, the electronic device 330 may comprise, by way of non-limiting example, a microelectromechanical system (MEMS) device, and the electrically controllable light-direction-changing elements may comprise bi-static mirrors that have two (2) states, a reflective state and a non-reflective state. Thus, the electrically controllable light-direction-changing elements change the direction of light via reflection. In another aspect, the electronic device 330 may comprise a MEMS device, wherein the electrically controllable light-direction-changing elements comprise mirrors that can be controlled to be at a range of different heights proportional to an applied voltage. In another aspect, the electronic device 330 may comprise a nematic liquid crystal on silicon (LCOS) device, and the electrically controllable light-direction-changing elements may comprise nematic liquid crystals whose refractive index may be alterable in response to an applied voltage. In this aspect, the electrically controllable light-direction-changing elements change the direction of light via refraction.

A controller 332 is communicatively coupled to the electronic device 330 and is configured to control the electrically controllable light-direction-changing elements to generate a successive series of different diffraction grating patterns configured to move at least one intensity maxima to a corresponding successive series of locations across a field of view (FOV). The controller 332 may comprise a single control device or may comprise multiple communicatively coupled control devices. A receiver 334 is configured to detect a reflection of the at least one intensity maxima from an object surface. The controller 332 is further configured to determine a distance and a relative location of the object surface based on the reflection.

Figure 4:
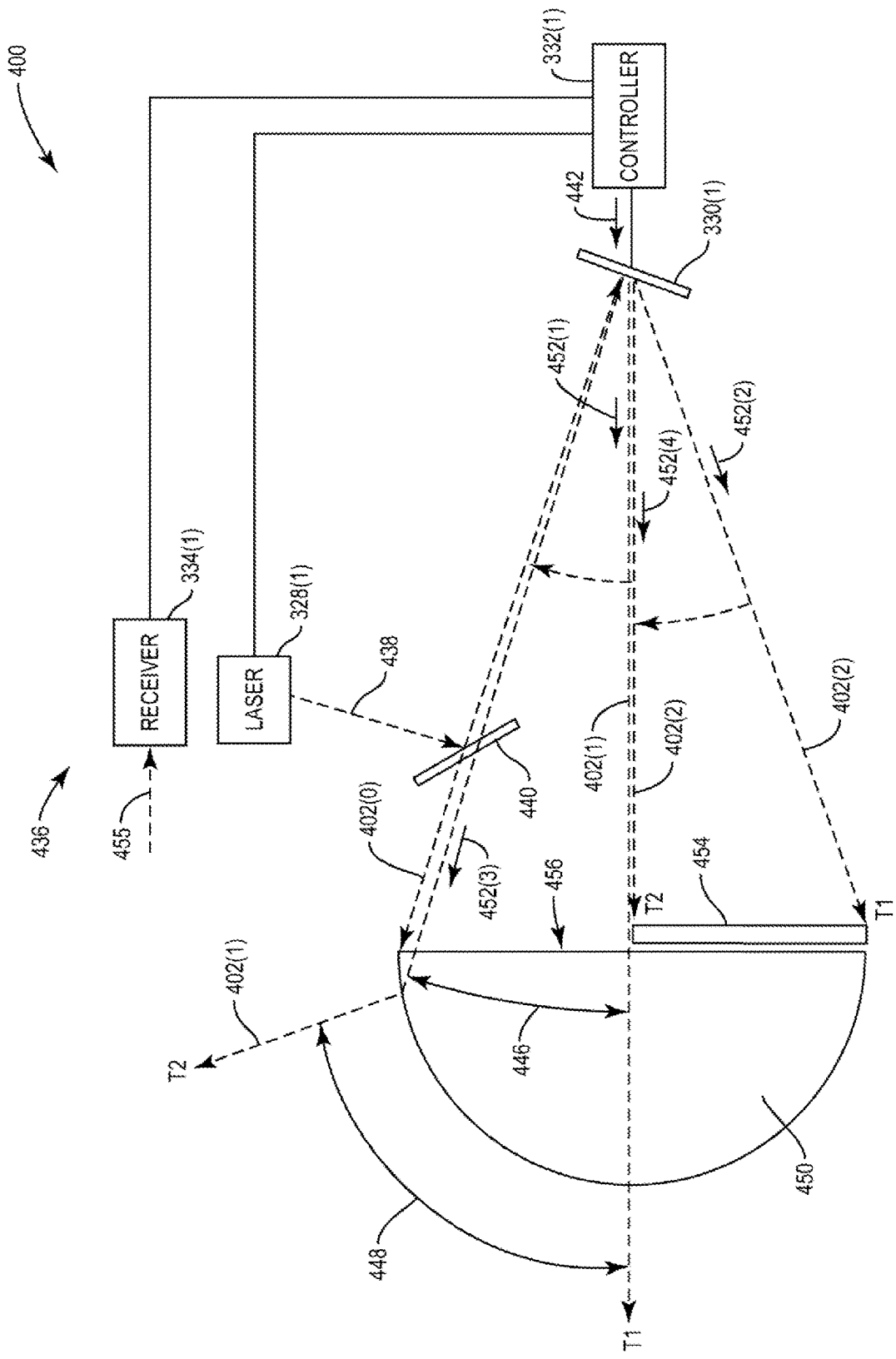
FIG. 4 is a block diagram of an exemplary LIDAR system that electronically controls light-direction-changing elements to move an intensity maxima across an FOV according to another aspect.

FIG. 4 is a block diagram 400 of a LIDAR system 436 according to one aspect. The LIDAR system 436 includes a laser 328(1) that is configured to emit a laser beam 438 toward a beam splitter 440. The laser beam 438 is reflected by the beam splitter 440 toward an electronic device 330(1) that comprises a plurality of electrically controllable light-direction-changing elements. A controller 332(1) is configured to send a series of signals 442 to the electronic device 330(1) to control the electrically controllable light-direction-changing elements to generate a successive series of different diffraction grating patterns configured to move at least one intensity maxima 402(1) to a corresponding successive series of locations across an FOV 446. The FOV 446 identifies the desired angular movement of the at least one intensity maxima 402(1) over the series of different diffraction grating patterns. A system FOV 448 may be greater than, or less than, the FOV 446. In this example, the system FOV 448 is expanded via a fish-eye lens 450 through which the at least one intensity maxima 402(1) is transmitted, and which exhibits non-linear angle transformation of the at least one intensity maxima 402(1). It is apparent that other optical elements, in addition to or in place of the fish-eye lens 450, could be utilized to control the transmission of the at least one intensity maxima 402(1) as desired, to generate any desired system FOV 448.

At a time T1, the controller 332(1) sends a signal 442 to the electronic device 330(1) to control the electrically controllable light-direction-changing elements to generate a diffraction grating pattern that causes the at least one intensity maxima 402(1) to be oriented in a direction 452(1). In this example, the at least one intensity maxima 402(1) is a first order intensity maxima (i.e., m=1). At the time T1, a second order intensity maxima 402(2) (i.e., m=2) is oriented in a direction 452(2), based on the diffraction grating equation discussed above with regard to FIG. 2. A diaphragm 454 blocks the second order intensity maxima 402(2) and prevents the second order intensity maxima 402(2) from being transmitted beyond the LIDAR system 436. Because in this example the laser beam 438 strikes the electronic device 330(1) at a ninety (90) degree angle to the surface of the electronic device 330(1), a zero order intensity maxima 402(0) (i.e., m=0) is oriented in the same direction as the laser beam 438. The zero order intensity maxima 402(0) is directed at a non-transmissive edge of the fish-eye lens 450 and is blocked from being transmitted beyond the LIDAR system 436.

A receiver 334(1) detects reflections 455 of the first order intensity maxima 402(1) from an object surface, if any, that is impinged by the first order intensity maxima 402(1). The controller 332(1) is configured to determine a distance and a relative location of the object surface based on the reflections 455 and the orientation of the first order intensity maxima 402(1) at the time the reflections 455 are received. In particular, the controller 332(1) can determine, based on the particular diffraction grating pattern formed by the electronic device 330(1) at the time the reflections 455 are detected, the precise angular orientation of the first order intensity maxima 402(1). In this aspect, the controller 332(1) can also determine, based on the predetermined optical characteristics of the fish-eye lens 450 and the orientation of the first order intensity maxima 402(1) with respect to a surface 456 of the fish-eye lens 450, the angle at which the first order intensity maxima 402(1) is refracted by the fish-eye lens 450, and thus the precise direction in which the first order intensity maxima 402(1) was transmitted into the environment. Based on the round trip time of the reflected light, the controller 332(1) can also determine the distance of the object surface from the LIDAR system 436.

Over a period of time that extends from the time T1 to a time T2, the controller 332(1) controls the electrically controllable light-direction-changing elements of the electronic device 330(1) to generate a successive series of different diffraction grating patterns that are configured to move the first order intensity maxima 402(1) to a corresponding successive series of locations across the FOV 446. At the time T2, the first order intensity maxima 402(1) may be oriented in a direction 452(3). The controller 332(1) may then control the electrically controllable light-direction-changing elements of the electronic device 330(1) to restart the successive series of different diffraction grating patterns, such that the first order intensity maxima 402(1) repetitively scans across the FOV 446. This scan rate may be implemented at any desired rate, such as, by way of non-limiting example, 60 or 120 Hertz.

At the time T2, the second order intensity maxima 402(2) may be oriented in a direction 452(4) and thus is continually blocked by the diaphragm 454 from being transmitted beyond the LIDAR system 436.

Figure 5:
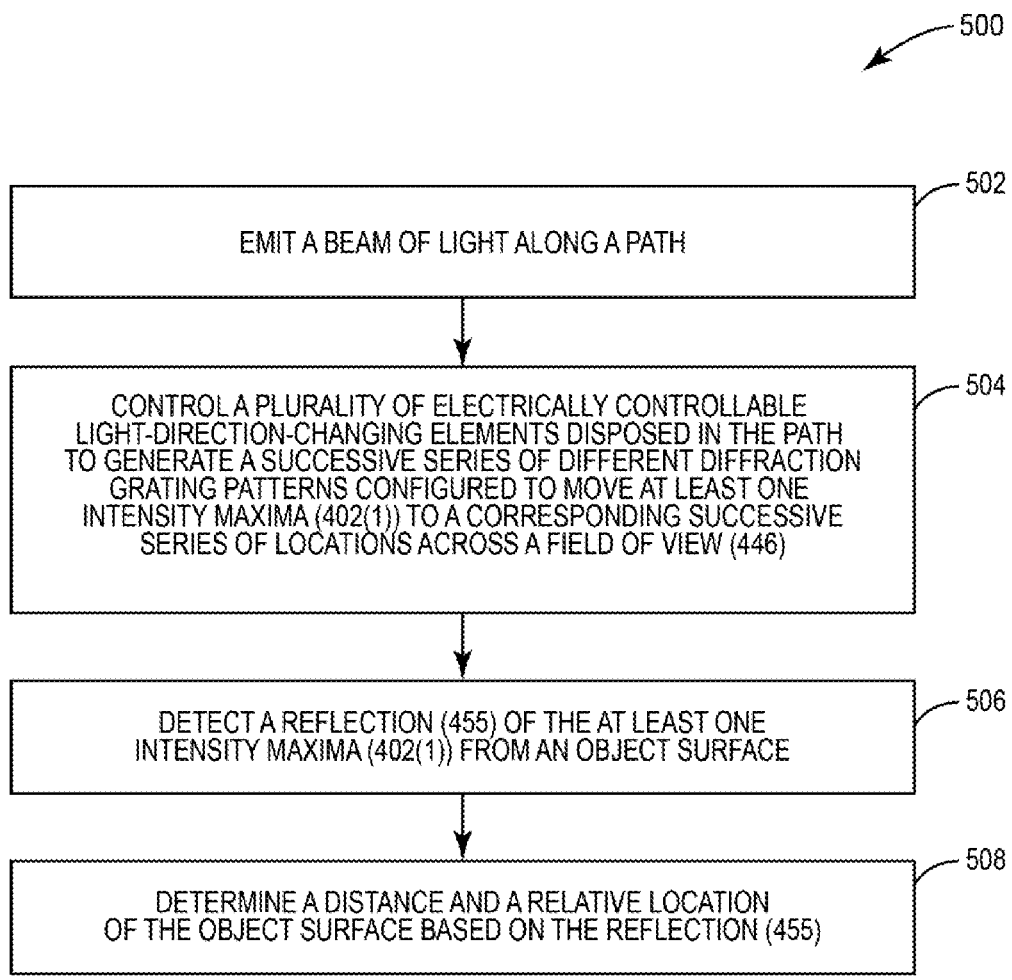
FIG. 5 is a flowchart of an exemplary method of electronically generating a plurality of different diffraction grating patterns in a LIDAR system according to one aspect.

FIG. 5 is flowchart 500 of a method according to one aspect. FIG. 5 will be discussed in conjunction with FIG. 4. The laser 328(1) emits a beam of light, in this example the laser beam 438, along a path (block 502). In this example, the beam splitter 440 is in the path, such that the laser beam 438 is reflected along the path toward the electronic device 330(1), but the beam splitter 440 is optional and may not be utilized in other aspects. The electronic device 330(1) is in the path and includes a plurality of electrically controllable light-direction-changing elements. The controller 332(1) controls the plurality of electrically controllable light-direction-changing elements to generate a successive series of different diffraction grating patterns configured to move the at least one intensity maxima 402(1) to a corresponding successive series of locations across the FOV 446 (block 504). The receiver 334(1) detects a reflection 455 of the at least one intensity maxima 402(1) from an object surface (block 506). The controller 332(1) determines a distance and a relative location of the object surface based on the reflection 455 (block 508).

Figure 6:
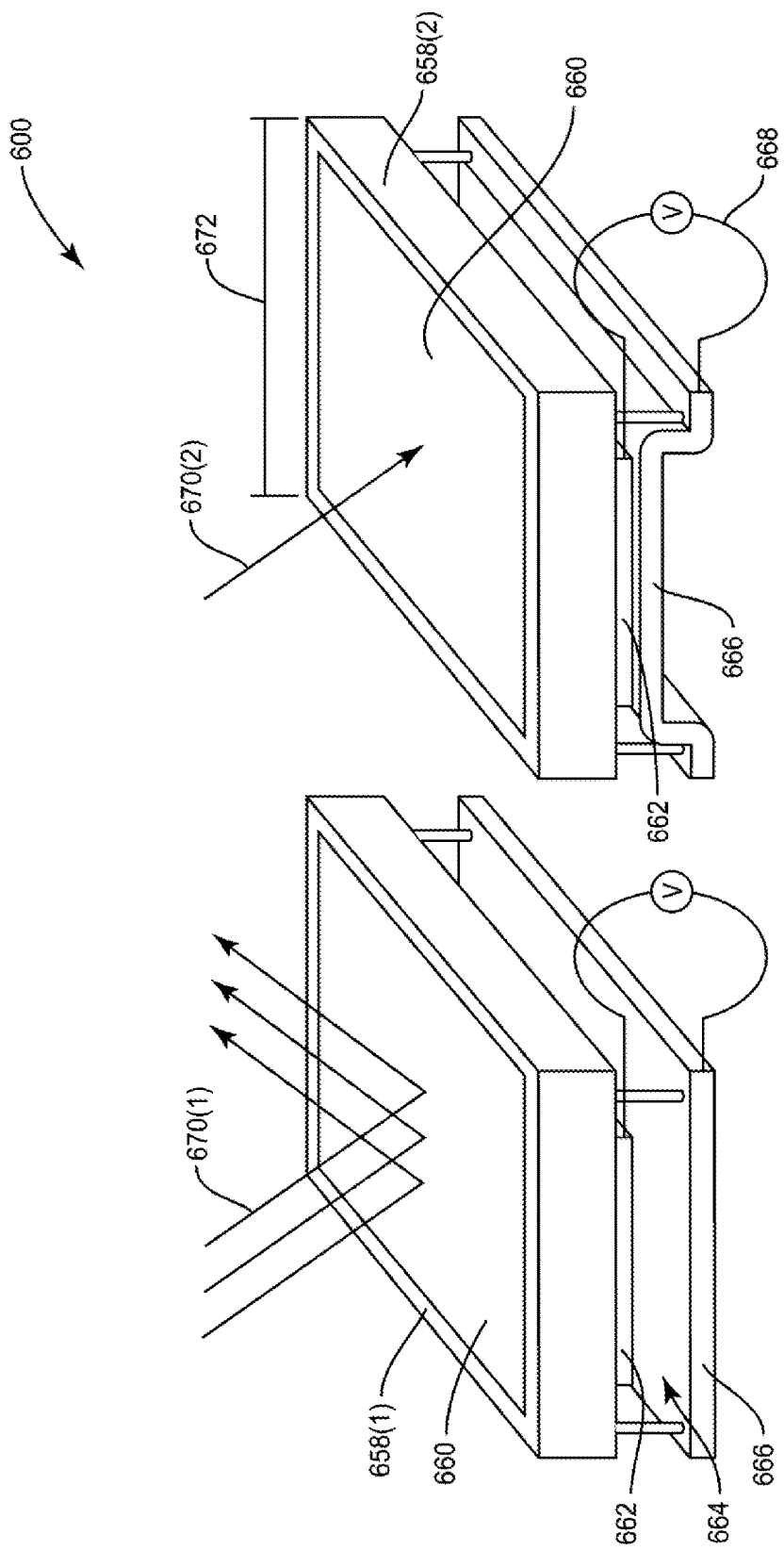
FIG. 6 is a diagram illustrating exemplary electrically controllable light-direction-changing elements in different states according to one aspect.

FIG. 6 is a diagram 600 illustrating individually electrically controllable light-direction-changing elements 658(1), 658(2), according to one aspect. In some aspects, the electrically controllable light-direction-changing elements 658(1), 658(2) may be reflective, and in other examples, the electrically controllable light-direction-changing elements 658(1), 658(2) may be refractive. In this example, the electrically controllable light-direction-changing elements 658(1), 658(2) (generally referred to hereinafter as elements 658(1), 658(2), respectively) are reflective and are associated with a MEMS device. The elements 658(1) each have a reflective state and a non-reflective state. The element 658(1), in this example, is in the reflective state and includes a glass substrate 660, a thin film stack 662, an air gap 664, and a reflective membrane 666. In order to put the element 658(1) in the reflective state, no voltage is applied between the thin film stack 662 and the reflective membrane 666, causing the reflective membrane 666 to be separated from the thin film stack 662 by the air gap 664. In the reflective state, light waves 670(1) reflect off the element 658(1).

The element 658(2), in this example, is in the non-reflective state and includes the glass substrate 660, the thin film stack 662, and the reflective membrane 666. In order to put the element 658(2) in the non-reflective state, a voltage 668 is applied between the thin film stack 662 and the reflective membrane 666, causing the reflective membrane 666 to move toward the thin film stack 662, such that there is little or no air gap 664. In the non-reflective state, light waves 670(2) reflect off the element 658(2). In some aspects, the elements 658(1), 658(2) may be switched from a non-reflective state to a reflective state at megahertz rates.

In one aspect, the elements 658(1), 658(2) have a width 672 between about 10 and about 100 microns. In one aspect, the distance between the reflective membrane 666 and the glass substrate 660, when in the reflective state, may be about 1 micron. The elements 658(1), 658(2) have a width 672 between about 10 and about 100 microns. While the electronic device 330 of FIG. 3 may comprise any desired resolution, in one aspect the electronic device 330 comprises an array of about 8000 by 8000 elements 658.

FIGS. 7A-7D are diagrams 700(1)-700(4) that illustrate side views of a plurality of electrically controllable light-direction-changing elements 658 of an electronic device 330(2) being controlled to generate a successive series of different diffraction grating patterns 706(1)-706(4) that are configured to move an intensity maxima 702 to a corresponding successive series of locations across an FOV, according to one aspect. In this aspect, the electrically controllable light-direction-changing elements 658 are reflective. For purposes of brevity and illustration, the electrically controllable light-direction-changing elements 658 will be referred to hereinafter as the elements 658 and are labeled in FIGS. 7A-7D with a designation indicating whether the element 658 is in a reflective (R) state or a non-reflective (N) state.

Figure 7A:
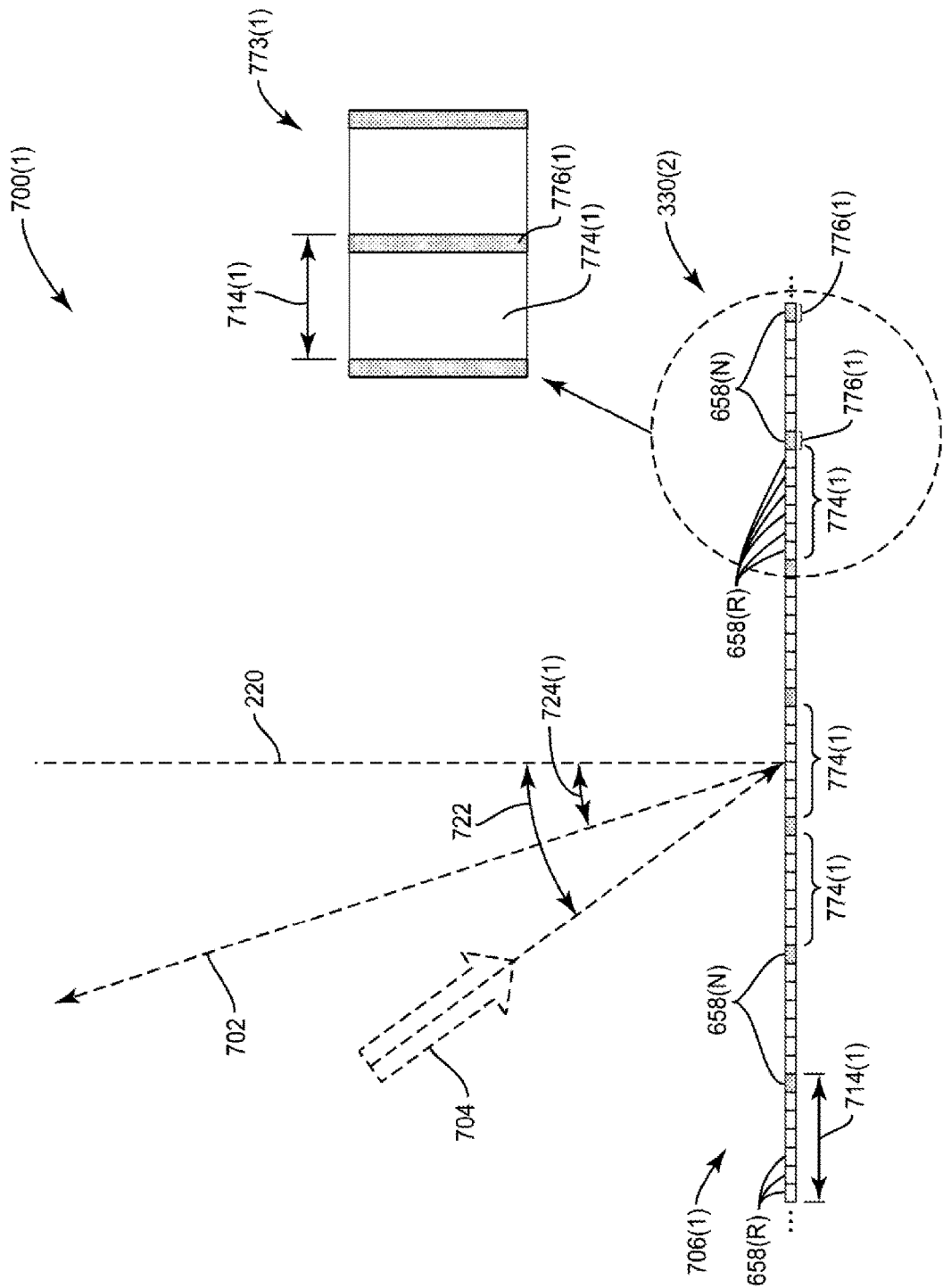
FIGS. 7A-7D are diagrams that illustrate a plurality of electrically controllable light-direction-changing elements of a device being controlled to generate a successive series of different diffraction grating patterns that are configured to move an intensity maxima to a corresponding successive series of locations across an FOV, according to one aspect.

Referring first to FIG. 7A, sets of consecutive elements 658(R) are controlled to be reflective to collectively form a plurality of reflective surfaces 774(1) across the surface of the electronic device 330(2). While each set, solely for purposes of illustration, is illustrated as comprising six elements 658(R), it is apparent that each set could comprise any desired number of elements 658(R) in order to form a reflective surface 774(1) of a desired width.

Sets of consecutive elements 658(N) are controlled to be non-reflective to collectively form a plurality of non-reflective surfaces 776(1) that are interlaced with the reflective surfaces 774(1) to form the diffraction grating pattern 706(1). Again, while each set, solely for purposes of illustration, is illustrated as comprising one element 658(N), it is apparent that each set could comprise any desired number of elements 658(N) in order to form a non-reflective surface 776(1) of a desired width.

Each reflective surface 774(1) is a distance 714(1) from an adjacent reflective surface 774(1). An inset 773(1) illustrates a plan (top) view of a portion of the diffraction grating pattern 706(1), illustrating the distance 714(1) between two adjacent reflective surfaces 774(1).

In this example, when a laser beam 704 is incident on the elements 658 at an angle 722 with respect to the surface normal 220, the diffraction grating pattern 706(1) causes the intensity maxima 702 to be formed that is oriented at an angle 724(1) with respect to the surface normal 220. Thus, if the receiver 334 (not shown) detects a reflection of the intensity maxima 702 from an object surface, the controller 332 (not shown) can determine that the orientation of the intensity maxima 702 at the time of the reflection is the angle 724(1) with respect to the surface normal 220.

Figure 7B:
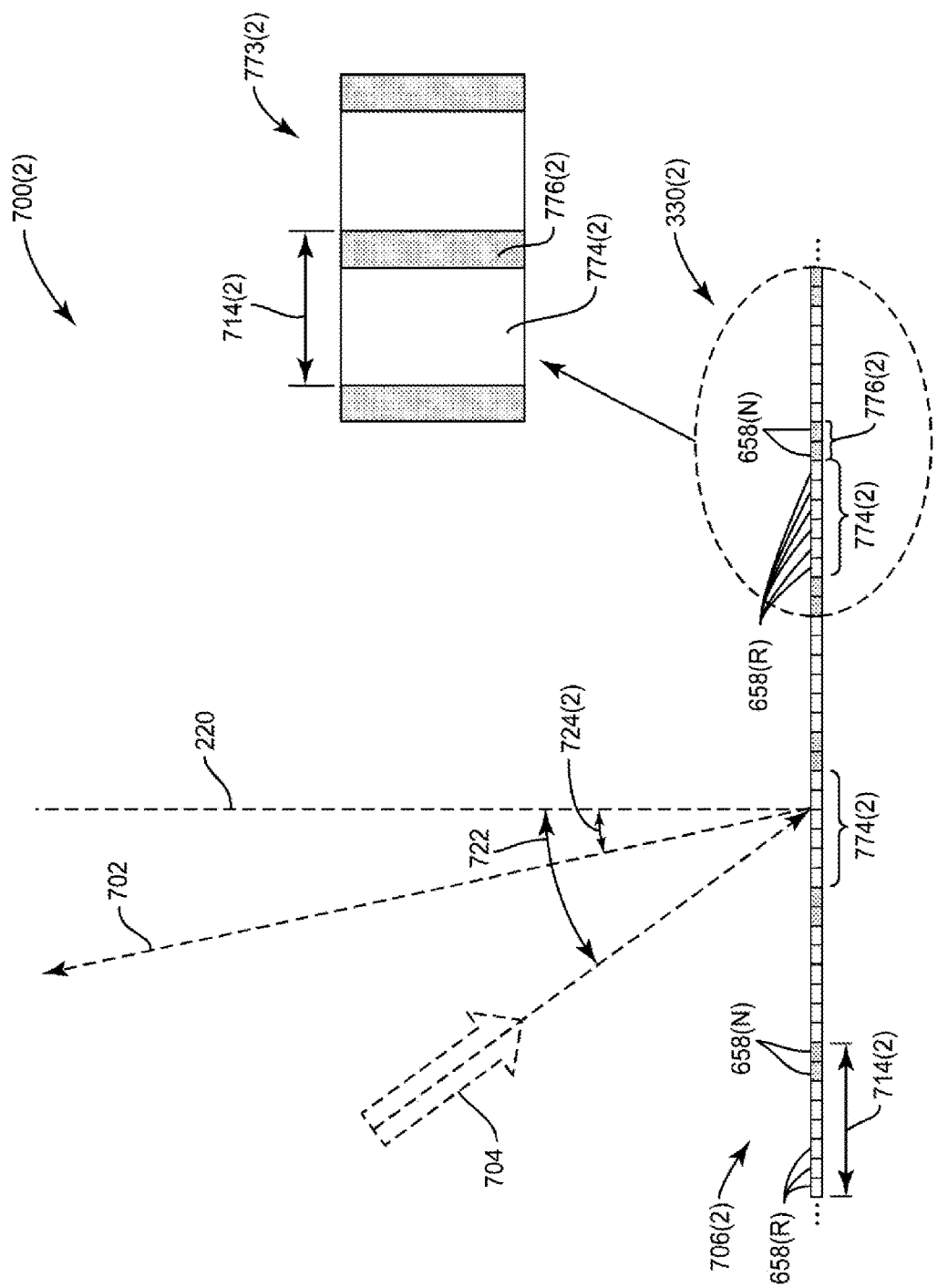

Referring next to FIG. 7B, sets of consecutive elements 658(R) are controlled to be reflective to collectively form a plurality of reflective surfaces 774(2) (only some labeled for purposes of readability) across the surface of the electronic device 330(2). Sets of consecutive elements 658(N) are controlled to be non-reflective to collectively form a plurality of non-reflective surfaces 776(2) (only some labeled for purposes of readability) that are interlaced with the reflective surfaces 774(2) to form the diffraction grating pattern 706(2).

Each reflective surface 774(2) is a distance 714(2) from an adjacent reflective surface 774(2). The distance 714(2) is greater than the distance 714(1) illustrated in FIG. 7A. An inset 773(2) illustrates a plan (top) view of a portion of the diffraction grating pattern 706(2), illustrating the distance 714(2) between two adjacent reflective surfaces 774(2). In this example, the reflective surfaces 774(2) are a same width as the reflective surfaces 774(1) illustrated in FIG. 7A, but the distance 714(2) is greater than the distance 714(1) illustrated in FIG. 7A, and thus the diffraction grating pattern 706(2) differs from the diffraction grating pattern 706(1).

In this example, when the laser beam 704 is incident on the elements 658 at the angle 722 with respect to the surface normal 220, the diffraction grating pattern 706(2) causes the intensity maxima 702 to be formed at an angle 724(2) with respect to the surface normal 220. Thus, if the receiver 334 (not shown) detects a reflection of the intensity maxima 702 from an object surface, the controller 332 (not shown) can determine that the orientation of the intensity maxima 702 at the time of the reflection is the angle 724(2) with respect to the surface normal 220.

Figure 7C:
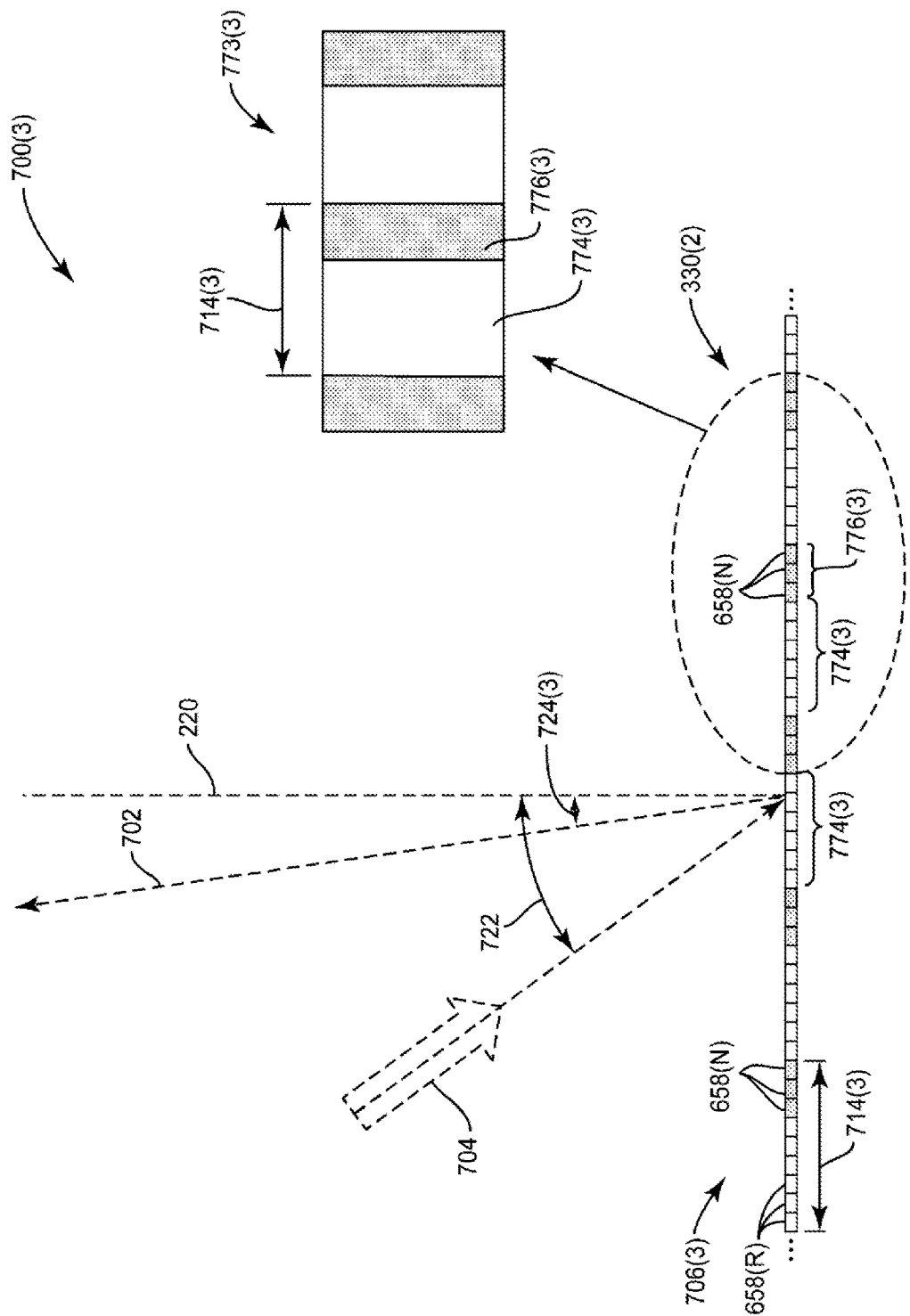

Referring next to FIG. 7C, sets of consecutive elements 658(R) are controlled to be reflective to collectively form a plurality of reflective surfaces 774(3) (only some labeled for purposes of readability) across the surface of the electronic device 330(2). Sets of consecutive elements 658(N) are controlled to be non-reflective to collectively form a plurality of non-reflective surfaces 776(3) (only some labeled for purposes of readability), that are interlaced with the reflective surfaces 774(3), to form the diffraction grating pattern 706(3).

Each reflective surface 774(3) is a distance 714(3) from an adjacent reflective surface 774(3). The distance 714(3) is greater than the distance 714(2) illustrated in FIG. 7B. An inset 773(3) illustrates a plan (top) view of a portion of the diffraction grating pattern 706(3), illustrating the distance 714(3) between two adjacent reflective surfaces 774(3). In this example, the reflective surfaces 774(3) are a same width as the reflective surfaces 774(2) illustrated in FIG. 7B, but the distance 714(3) is greater than the distance 714(2) illustrated in FIG. 7B, and thus the diffraction grating pattern 706(3) differs from the diffraction grating patterns 706(1), 706(2).

In this example, when the laser beam 704 is incident on the elements 658 at the angle 722 with respect to the surface normal 220, the diffraction grating pattern 706(3) causes the intensity maxima 702 to be formed at an angle 724(3) with respect to the surface normal 220. Thus, if the receiver 334 (not shown) detects a reflection of the intensity maxima 702 from an object surface, the controller 332 (not shown) can determine that the orientation of the intensity maxima 702 at the time of the reflection is the angle 724(3) with respect to the surface normal 220.

Figure 7D:
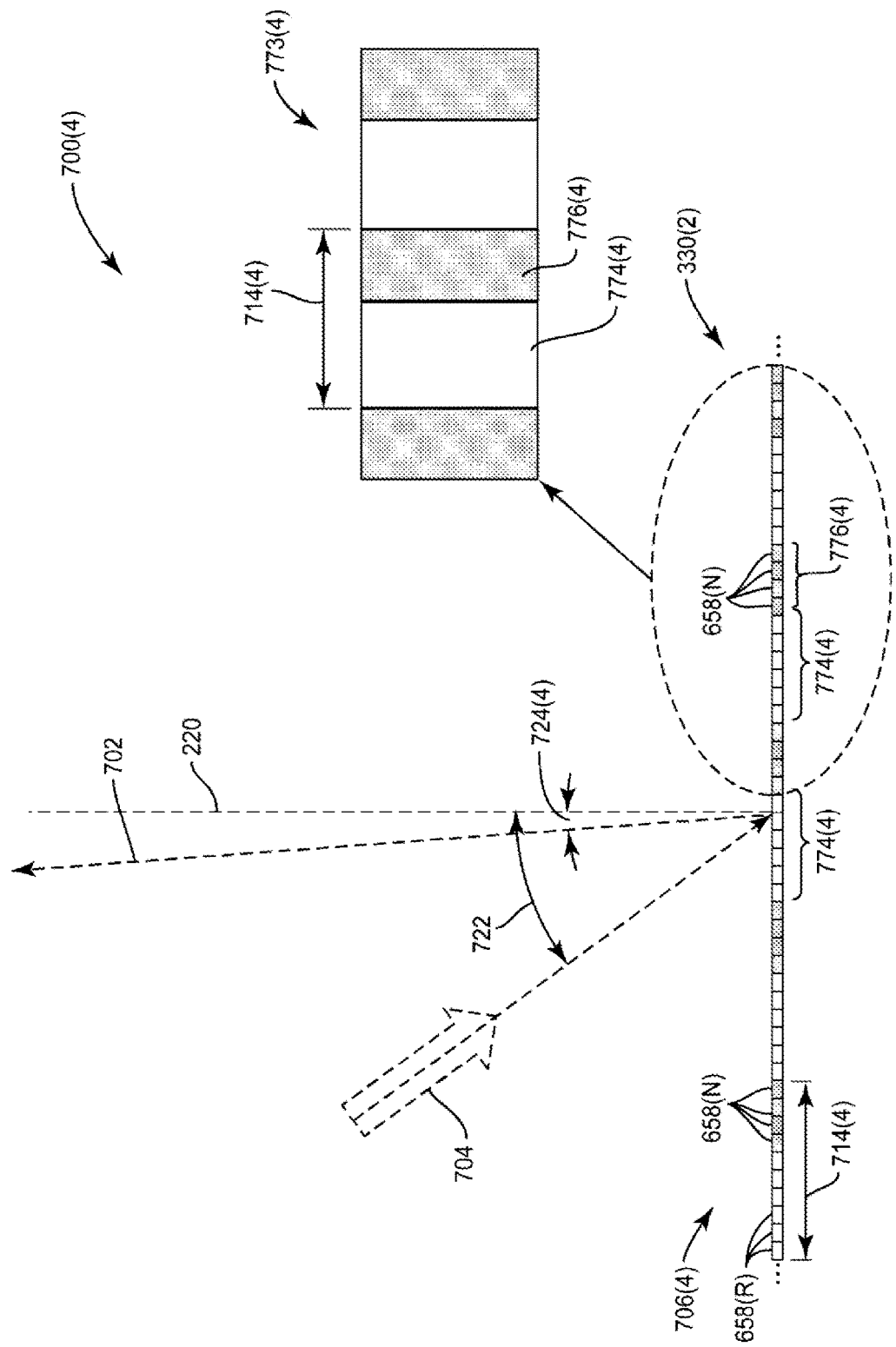

Referring next to FIG. 7D, sets of consecutive elements 658(R) are controlled to be reflective to collectively form a plurality of reflective surfaces 774(4) (only some labeled for purposes of readability) across the surface of the electronic device 330(2). Sets of consecutive elements 658(N) are controlled to be non-reflective to collectively form a plurality of non-reflective surfaces 776(4) (only some labeled for purposes of readability), that are interlaced with the reflective surfaces 774(4), to form the diffraction grating pattern 706(4).

Each reflective surface 774(4) is a distance 714(4) from an adjacent reflective surface 774(4). The distance 714(4) is greater than the distance 714(3) illustrated in FIG. 7C. An inset 773(4) illustrates a plan (top) view of a portion of the diffraction grating pattern 706(4), illustrating the distance 714(4) between two adjacent reflective surfaces 774(4). In this example, the reflective surfaces 774(4) are a same width as the reflective surfaces 774(3) illustrated in FIG. 7C, but the distance 714(4) is greater than the distance 714(3) illustrated in FIG. 7C, and thus the diffraction grating pattern 706(4) differs from the diffraction grating patterns 706(1), 706(2), 706(3).

In this example, when the laser beam 704 is incident on the elements 658 at the angle 722 with respect to the surface normal 220, the diffraction grating pattern 706(4) causes the intensity maxima 702 to be formed at an angle 724(4) with respect to the surface normal 220. Thus, if the receiver 334 (not shown) detects a reflection of the intensity maxima 702 from an object surface, the controller 332 (not shown) can determine that the orientation of the intensity maxima 702 at the time of the reflection is the angle 724(4) with respect to the surface normal 220.

FIGS. 8A-8D are diagrams 800(1)-800(4) that illustrate side views of a plurality of elements 658 of the electronic device 330(2) being controlled to generate a successive series of different diffraction grating patterns 806(1)-806(4) that are configured to move an intensity maxima 802 to a corresponding successive series of locations across an FOV, according to another aspect. Again, elements 658 are labeled in FIGS. 8A-8D with a designation indicating whether the element 658 is in a reflective (R) state or a non-reflective (N) state. In this example, the diffraction grating patterns 806(1)-806(4) differ, at least in part, based on a width of the reflective surfaces.

Figure 8A:
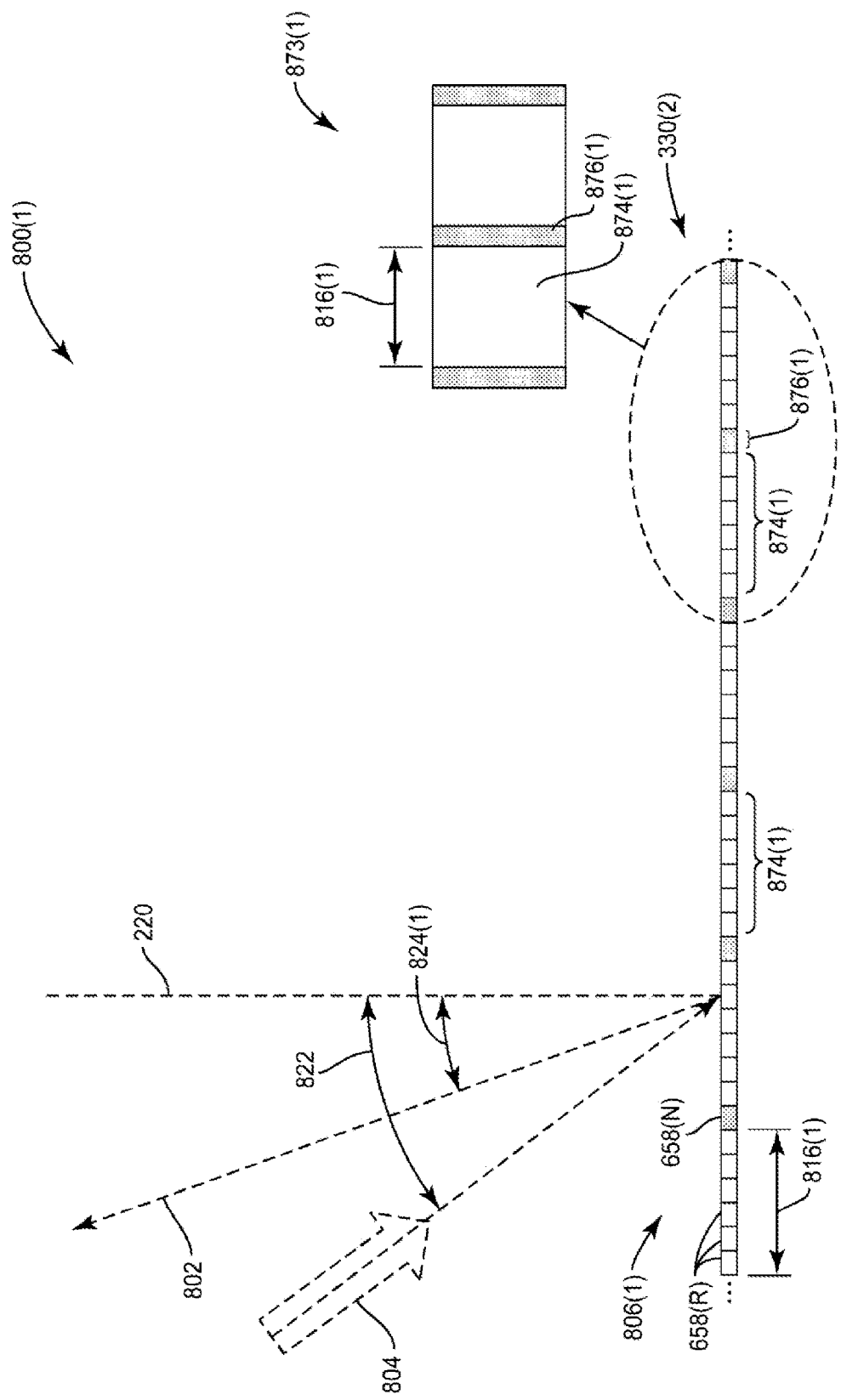
FIGS. 8A-8D are diagrams that illustrate side views of a plurality of electrically controllable light-direction-changing elements of a device being controlled to generate a successive series of different diffraction grating patterns that are configured to move an intensity maxima to a corresponding successive series of locations across an FOV, according to another aspect.

Referring first to FIG. 8A, sets of consecutive elements 658(R) are controlled to be reflective to collectively form a plurality of reflective surfaces 874(1) (only some labeled for purposes of readability) across the surface of the electronic device 330(2). While each set, solely for purposes of illustration, is illustrated as comprising six elements 658(R), it is apparent that each set could comprise any desired number of elements 658(R) in order to form a reflective surface 874(1) of a desired width.

Sets of consecutive elements 658(N) are controlled to be non-reflective to collectively form a plurality of non-reflective surfaces 876(1) (only some labeled for purposes of readability) that are interlaced with the reflective surfaces 874(1) to form the diffraction grating pattern 806(1). Again, while each set, solely for purposes of illustration, is illustrated as comprising one element 658(N), it is apparent that each set could comprise any desired number of elements 658(N) in order to form a non-reflective surface 876(1) of a desired width.

Each reflective surface 874(1) has a same width 816(1). An inset 873(1) illustrates a plan (top) view of a portion of the diffraction grating pattern 806(1), illustrating the width 816(1) of a reflective surface 874(1).

In this example, when a laser beam 804 is incident on the elements 658 at an angle 822 with respect to the surface normal 220, the diffraction grating pattern 806(1) causes the intensity maxima 802 to be formed that is oriented at an angle 824(1) with respect to the surface normal 220. Thus, if the receiver 334 (not shown) detects a reflection of the intensity maxima 802 from an object surface, the controller 332 (not shown) can determine that the orientation of the intensity maxima 802 at the time of the reflection is the angle 824(1) with respect to the surface normal 220.

Figure 8B:
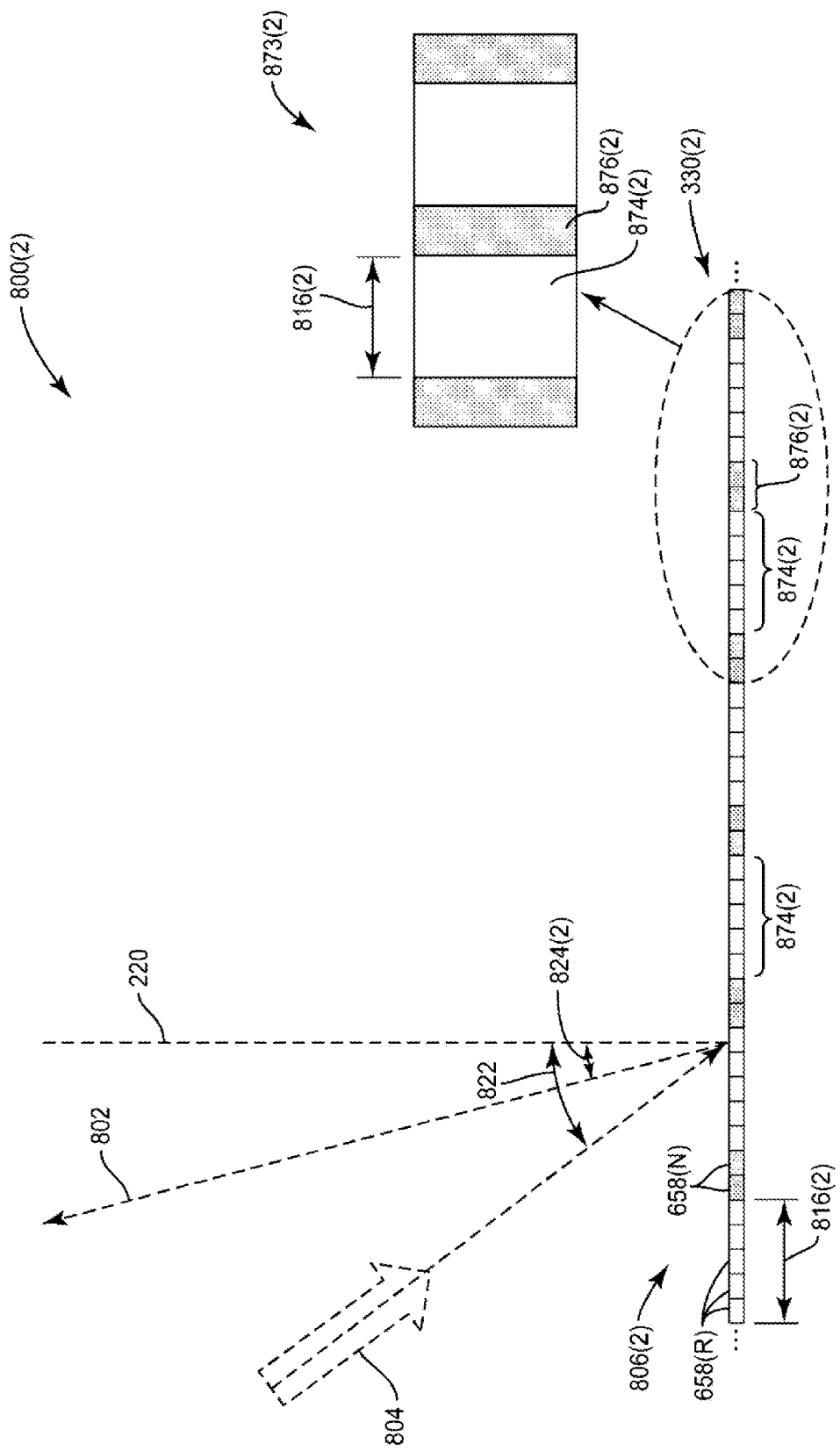

Referring next to FIG. 8B, sets of consecutive elements 658(R) are controlled to be reflective to collectively form a plurality of reflective surfaces 874(2) (only some labeled for purposes of readability) across the surface of the electronic device 330(2). Sets of consecutive elements 658(N) are controlled to be non-reflective to collectively form a plurality of non-reflective surfaces 876(2) (only some labeled for purposes of readability) that are interlaced with the reflective surfaces 874(2) to form the diffraction grating pattern 806(2).

Each reflective surface 874(2) has a same width 816(2). An inset 873(2) illustrates a plan (top) view of a portion of the diffraction grating pattern 806(2), illustrating the width 816(2) of the reflective surfaces 874(2). In this example, the reflective surfaces 874(2) have a different width 816(2) from the reflective surfaces 874(1) illustrated in FIG. 8A, and thus the diffraction grating pattern 806(2) differs from the diffraction grating pattern 806(1).

In this example, when the laser beam 804 is incident on the elements 658 at the angle 822 with respect to the surface normal 220, the diffraction grating pattern 806(2) causes the intensity maxima 802 to be formed at an angle 824(2) with respect to the surface normal 220. Thus, if the receiver 334 (not shown) detects a reflection of the intensity maxima 802 from an object surface, the controller 332 (not shown) can determine that the orientation of the intensity maxima 802 at the time of the reflection is the angle 824(2) with respect to the surface normal 220.

Figure 8C:
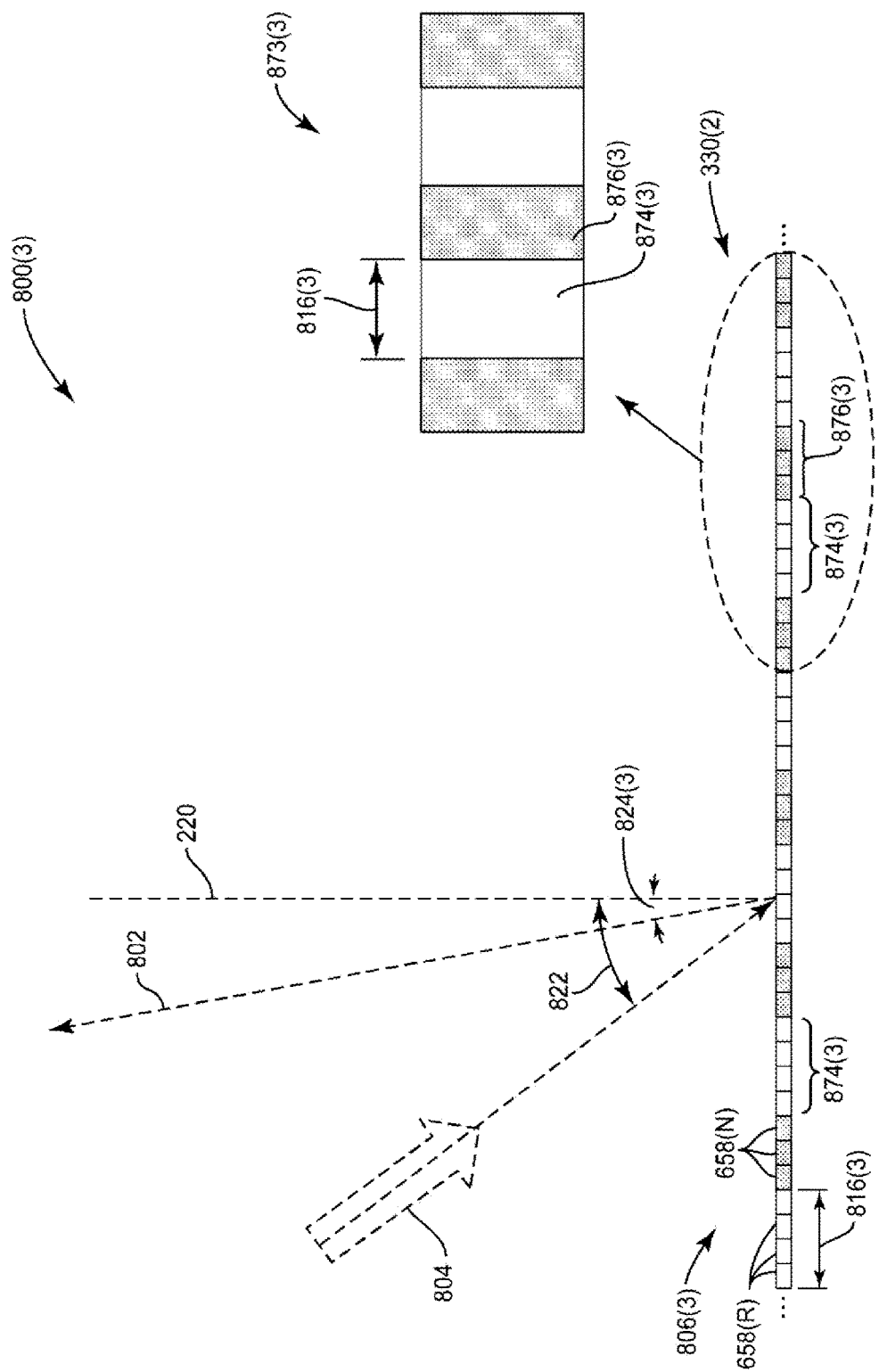

Referring next to FIG. 8C, sets of consecutive elements 658(R) are controlled to be reflective to collectively form a plurality of reflective surfaces 874(3) (only some labeled for purposes of readability) across the surface of the electronic device 330(2). Sets of consecutive elements 658(N) are controlled to be non-reflective to collectively form a plurality of non-reflective surfaces 876(3) (only some labeled for purposes of readability) that are interlaced with the reflective surfaces 874(3) to form the diffraction grating pattern 806(3).

Each reflective surface 874(3) has a same width 816(3). An inset 873(3) illustrates a plan (top) view of a portion of the diffraction grating pattern 806(3), illustrating the width 816(3) of the reflective surfaces 874(3). In this example, the reflective surfaces 874(3) have a different width 816(3) than the reflective surfaces 874(2) illustrated in FIG. 8B, and thus the diffraction grating pattern 806(3) differs from the diffraction grating patterns 806(2), 806(1).

In this example, when the laser beam 804 is incident on the elements 658 at the angle 822 with respect to the surface normal 220, the diffraction grating pattern 806(3) causes the intensity maxima 802 to be formed at an angle 824(3) with respect to the surface normal 220. Thus, if the receiver 334 (not shown) detects a reflection of the intensity maxima 802 from an object surface, the controller 332 (not shown) can determine that the orientation of the intensity maxima 802 at the time of the reflection is the angle 824(3) with respect to the surface normal 220.

Figure 8D:
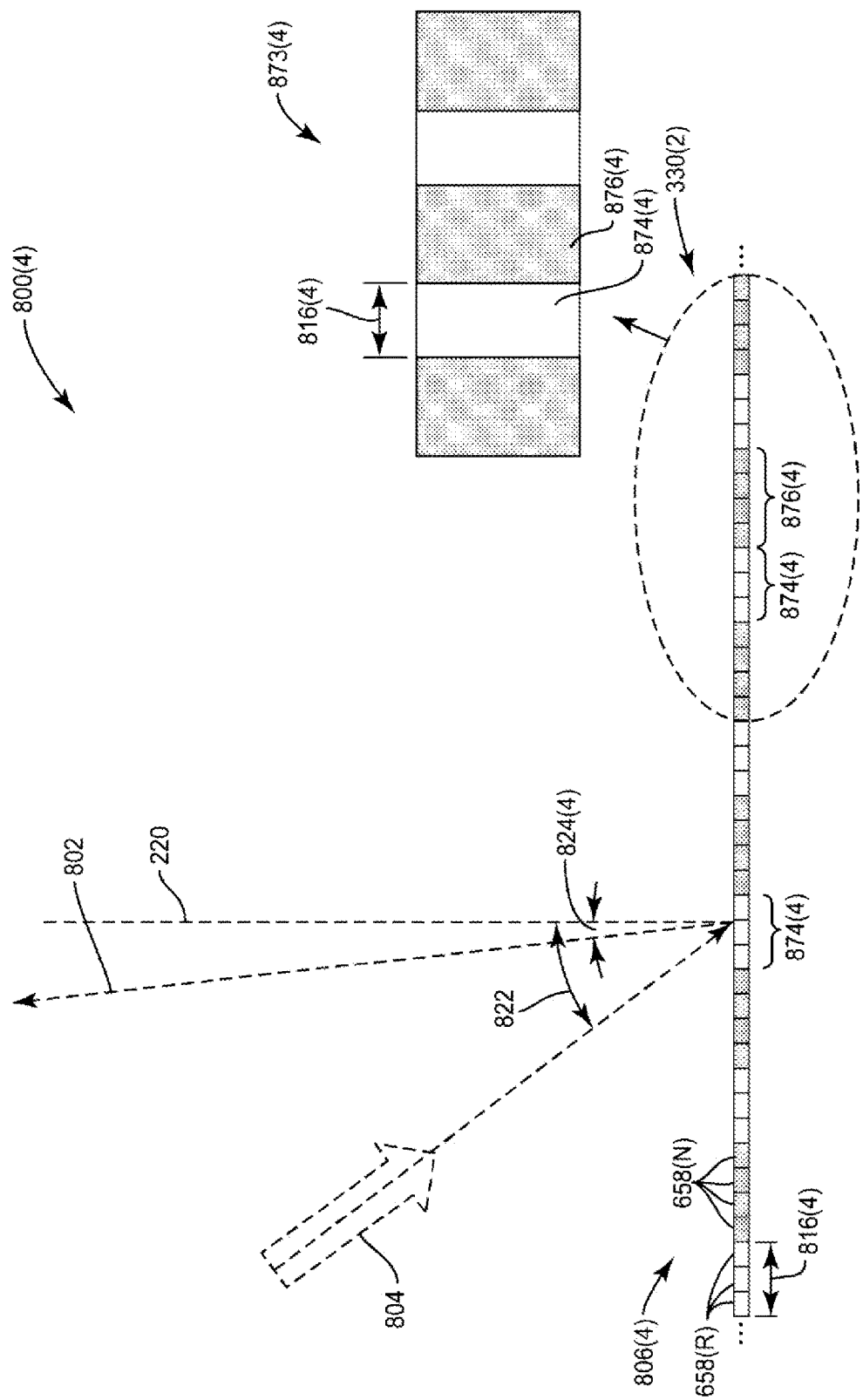

Referring next to FIG. 8D, sets of consecutive elements 658(R) are controlled to be reflective to collectively form a plurality of reflective surfaces 874(4) (only some labeled for purposes of readability) across the surface of the electronic device 330(2). Sets of consecutive elements 658(N) are controlled to be non-reflective to collectively form a plurality of non-reflective surfaces 876(4) (only some labeled for purposes of readability) that are interlaced with the reflective surfaces 874(4) to form the diffraction grating pattern 806(4).

Each reflective surface 874(4) has a same width 816(4). An inset 873(4) illustrates a plan (top) view of a portion of the diffraction grating pattern 806(4), illustrating the width 816(4) of the reflective surfaces 874(4). In this example, the reflective surfaces 874(4) have a different width 816(4) from the reflective surfaces 874(3) illustrated in FIG. 8C, and thus the diffraction grating pattern 806(4) differs from the diffraction grating patterns 806(3), 806(2), 806(1).

In this example, when the laser beam 804 is incident on the elements 658 at the angle 822 with respect to the surface normal 220, the diffraction grating pattern 806(4) causes the intensity maxima 802 to be formed at an angle 824(4) with respect to the surface normal 220. Thus, if the receiver 334 (not shown) detects a reflection of the intensity maxima 802 from an object surface, the controller 332 (not shown) can determine that the orientation of the intensity maxima 802 at the time of the reflection is the angle 824(4) with respect to the surface normal 220.

Figure 9A:
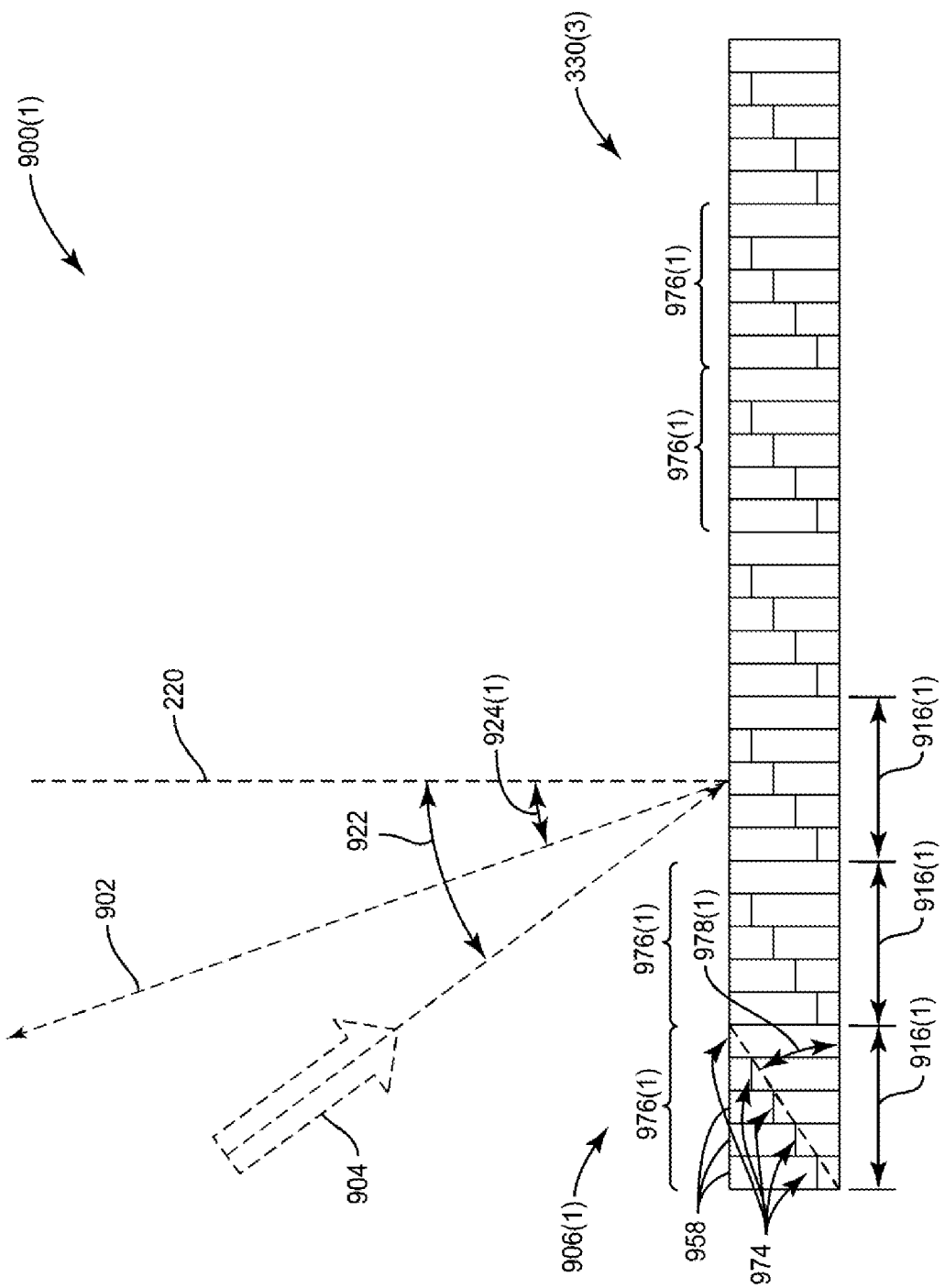
FIGS. 9A-9B are diagrams that illustrate side views of a plurality of electrically controllable light-direction-changing elements of a device being controlled to generate a successive series of different diffraction grating patterns that are configured to move an intensity maxima to a corresponding successive series of locations across an FOV, according to another aspect.
Figure 9B:
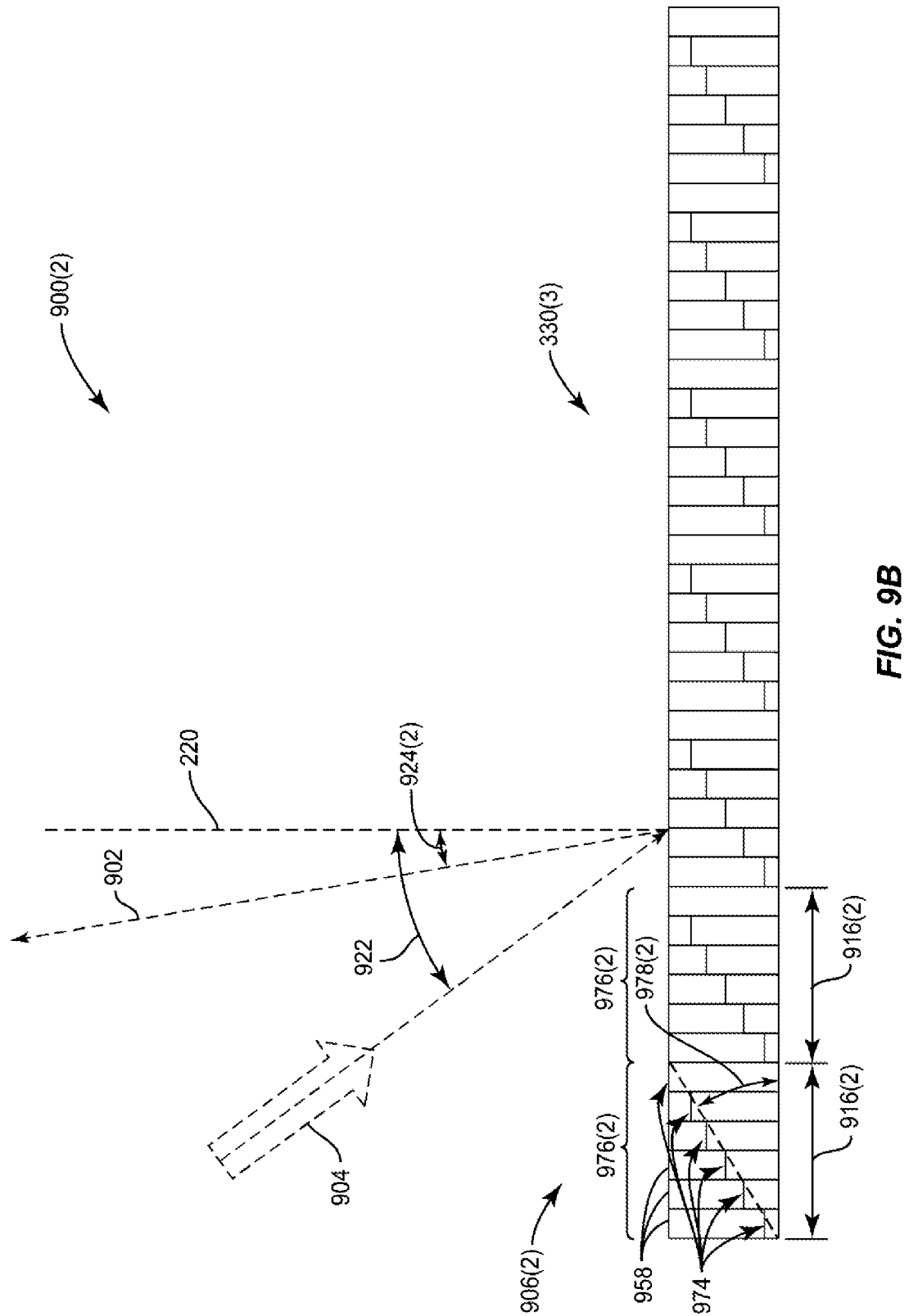

FIGS. 9A-9B are diagrams 900(1)-900(2) that illustrate side views of a plurality of individually electrically controllable light-direction-changing elements 958 of an electronic device 330(3) being controlled to generate a successive series of different diffraction grating patterns 906(1)-906(2) that are configured to move an intensity maxima 802 to a corresponding successive series of locations across an FOV, according to another aspect. In some aspects, the electrically controllable light-direction-changing elements 958 may be reflective, and in other examples, the electrically controllable light-direction-changing elements 958 may be refractive. In this example, the electrically controllable light-direction-changing elements 958 (generally referred to hereinafter as elements 958) are reflective, and the electronic device 330(3) comprises an interferometric modulator display (IMOD) MEMS device.

Referring first to FIG. 9A, the elements 958 comprise mirrors 974 that can be controlled to be at a range of different heights proportional to an applied voltage. In this aspect, sets of elements 958 are controlled to form a plurality of brazed reflective surfaces 976(1), wherein each brazed reflective surface 976(1) has a same width 916(1). Each brazed reflective surface 976(1) comprises a sequence of elements 958 wherein each element 958 has a respective mirror 974 controlled to be at a different height from that of an immediately adjacent element 958, such that the mirrors 974 form a surface having a particular blaze angle 978(1).

In this example, when a laser beam 904 is incident on the elements 958 at an angle 922 with respect to the surface normal 220, the diffraction grating pattern 906(1) causes the intensity maxima 902 to be formed at an angle 924(1) with respect to the surface normal 220. Thus, if the receiver 334 (not shown) detects a reflection of the intensity maxima 902 from an object surface, the controller 332 (not shown) can determine that the orientation of the intensity maxima 902 at the time of the reflection is the angle 924(1) with respect to the surface normal 220.

FIG. 9B illustrates sets of elements 958 that are controlled to form a plurality of brazed reflective surfaces 976(2), wherein each brazed reflective surface 976(2) has a same width 916(2). Each brazed reflective surface 976(2) comprises a sequence of elements 958 wherein each element 958 has a respective mirror 974 controlled to be at a different height from that of an immediately adjacent element 958, such that the mirrors 974 form a surface having a particular blaze angle 978(2) that is different from the blaze angle 978(1) associated with the diffraction grating pattern 906(1).

In this example, when the laser beam 904 is incident on the elements 958 at the angle 922 with respect to the surface normal 220, the diffraction grating pattern 906(2) causes the intensity maxima 902 to be formed at an angle 924(2) with respect to the surface normal 220. Thus, if the receiver 334 (not shown) detects a reflection of the intensity maxima 902 from an object surface, the controller 332 (not shown) can determine that the orientation of the intensity maxima 902 at the time of the reflection is the angle 924(2) with respect to the surface normal 220.

In another aspect, the electronic device 330(3) comprises a nematic liquid crystal on silicon (LCOS) device, and the individually electrically controllable light-direction-changing elements 958 are refractive and comprise nematic liquid crystals whose refractive index may be alterable in response to an applied voltage. Thus, in this aspect, the electrically controllable light-direction-changing elements 958 change the direction of light via refraction rather than reflection. Similarly to that described above with regard to FIGS. 9A-9B, the elements 958 may be controlled to form a successive series of different brazed diffraction grating patterns configured to move at least one intensity maxima to a corresponding series of locations across an FOV. In particular, an optical phase difference is created by controlling the elements 958 to alter the refraction index associated with the elements 958.

For example, referring to FIG. 9A, in this aspect, the elements 958 are refractive, the surfaces 976(1) comprise brazed refractive surfaces that are formed from five successive elements 958, and the phase shift for the first element 958 in each brazed refractive surface 976(1) is 1*2*PI/5; the phase shift for the second element 958 in each brazed refractive surface 976(1) is 2*2*PI/5; the phase shift for the third element 958 in each brazed refractive surface 976(1) is 3*2*PI/5; the phase shift for the fourth element 958 in each brazed refractive surface 976(1) is 4*2*PI/5; and the phase shift for the fifth element 958 in each brazed refractive surface 976(1) is 5*2*PI/5. The pattern may then be changed, for example, such that the brazed refractive surfaces 976(1) are formed from six successive elements 958, such that the phase shift for the first element 958 in each brazed refractive surface 976(1) is 1*2*PI/6; the phase shift for the second element 958 in each brazed refractive surface 976(1) is 2*2*PI/6; the phase shift for the third element 958 in each brazed refractive surface 976(1) is 3*2*PI/6; the phase shift for the fourth element 958 in each brazed refractive surface 976(1) is 4*2*PI/6; the phase shift for the fifth element 958 in each brazed refractive surface 976(1) is 5*2*PI/6; and the phase shift for the sixth element 958 in each brazed refractive surface 976(1) is 6*2*PI/6, thereby changing the angle of the intensity maxima 902 with respect to the surface normal 220.

Figure 10:
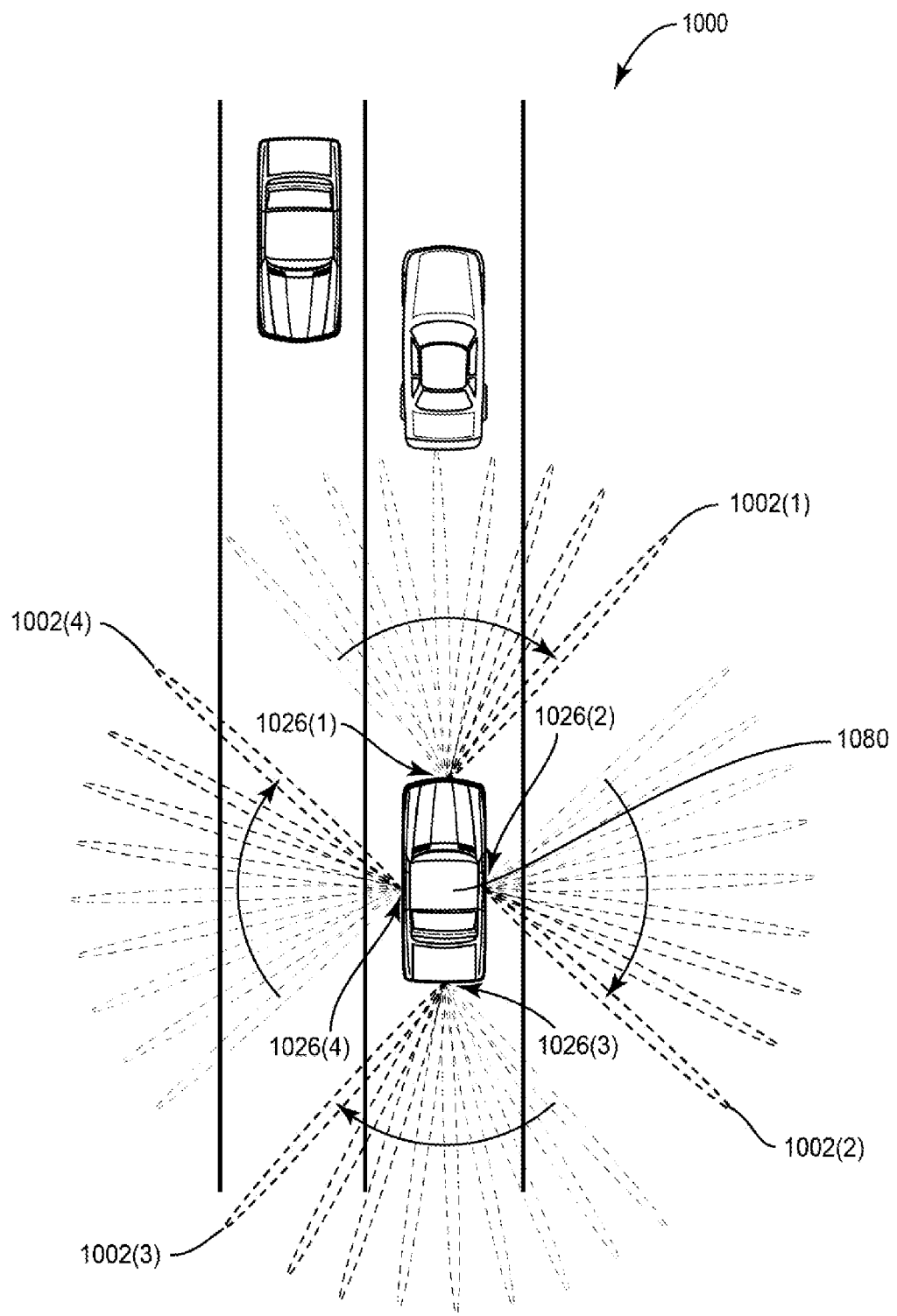
FIG. 10 is a diagram illustrating a use of a plurality of solid-state LIDAR systems, according to one aspect.

FIG. 10 is a diagram 1000 illustrating the use of a plurality of LIDAR systems 1026(1)-1026(4) according to one aspect. In this aspect, the LIDAR systems 1026(1)-1026(4) are mounted on a vehicle 1080. Each LIDAR system 1026(1)-1026(4) includes an electronic device 330 (not shown) comprising a plurality of electrically controllable light-direction-changing elements that are controlled to generate a series of different diffraction grating patterns configured to move a respective intensity maxima 1002(1)-1002(4) to a series of locations within a respective FOV. The collection of LIDAR systems 1026(1)-1026(4) can, for example, determine obstacles about the vehicle 1080 and can, for example, emit alarms or warnings or activate a subsystem for altering a direction and/or velocity of the vehicle 1080 as appropriate.

While for purposes of illustration the diffraction grating patterns have been illustrated as one-dimensional arrays or grids, it is apparent that the electrically controllable light-direction-changing elements can also be controlled to form two-dimensional arrays or grids, such that multi-dimensional diffraction grating patterns may be formed.

The aspects result in a relatively low-cost, low-weight, low-power, and reliable LIDAR system with few or no moving parts that has applicability in a wide range of applications, including, by way of non-limiting example, wireless phones, drones, quadcopters, obstacle detection and avoidance, robots, the generation of topographical maps, mapping features beneath forest canopy, atmospheric remote sensing, and the like.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An electronic device for use in a light detection and ranging (LIDAR) system, comprising:
   a microelectromechanical system (MEMS) device comprising a plurality of electrically controllable reflective elements; and
   an electronic device configured to:
      receive a beam of light from a laser; and
      receive, from a controller, a series of signals that control the plurality of electrically controllable reflective elements to generate a successive series of different diffraction grating patterns configured to move at least one intensity maxima to a corresponding successive series of locations across a field of view (FOV), wherein each different diffraction grating pattern of the successive series of different diffraction grating patterns comprises a plurality of alternating reflective surfaces and non-reflective surfaces, a distance d between the plurality of alternating reflective surfaces being constant, and wherein each different diffraction grating pattern of the successive series of different diffraction grating patterns has a different distance d between the plurality of alternating reflective surfaces.

2. The electronic device of claim 1, wherein each reflective surface comprises a set of consecutive electrically controllable reflective elements configured to be controlled to be reflective.

3. The electronic device of claim 2, wherein each non-reflective surface comprises a set of consecutive electrically controllable reflective elements that are controlled to be non-reflective.

4. The electronic device of claim 1, wherein the MEMS device comprises an interferometric modulator display (IMOD) MEMS device.

5. The electronic device of claim 1 integrated into an integrated circuit (IC).

6. A light detection and ranging (LIDAR) system for detecting a surface of an object, comprising:
   a laser configured to emit a beam of light along a path;
   a microelectromechanical system (MEMS) device comprising a plurality of electrically controllable reflective elements disposed in the path;
   a controller communicatively coupled to the MEMS device, the controller configured to control the plurality of electrically controllable reflective elements to generate a successive series of different diffraction grating patterns configured to move at least one intensity maxima to a corresponding successive series of locations across a field of view (FOV), wherein each different diffraction grating pattern of the successive series of different diffraction grating patterns comprises a plurality of alternating reflective surfaces and non-reflective surfaces, a distance d between the plurality of alternating reflective surfaces being constant, and wherein each different diffraction grating pattern of the successive series of different diffraction grating patterns has a different distance d between the plurality of alternating reflective surfaces; and
   a receiver configured to detect a reflection of the at least one intensity maxima from an object surface;
   wherein the controller is further configured to determine a distance and a relative location of the object surface based on the reflection.

7. The LIDAR system of claim 6, wherein each reflective surface comprises a set of consecutive electrically controllable reflective elements that are controlled to be reflective.

8. The LIDAR system of claim 7, wherein each non-reflective surface comprises a set of consecutive electrically controllable reflective elements that are controlled to be non-reflective.

9. The LIDAR system of claim 6, wherein the MEMS device comprises an interferometric modulator display (IMOD) MEMS device.

10. The LIDAR system of claim 6, wherein the laser is fixed with respect to the MEMS device.

11. The LIDAR system of claim 6, further comprising a fish-eye lens, wherein the at least one intensity maxima is transmitted via the fish-eye lens into an environment.

12. A light detection and ranging (LIDAR) system for detecting a surface of an object, comprising:
   a means for emitting a beam of light along a path;
   a means for controlling a microelectromechanical system (MEMS) device disposed in the path and comprising a plurality of electrically controllable reflective elements to generate a successive series of different diffraction grating patterns configured to move at least one intensity maxima to a corresponding successive series of locations across a field of view (FOV), wherein each different diffraction grating pattern of the successive series of different diffraction grating patterns comprises a plurality of alternating reflective surfaces and non-reflective surfaces, a distance d between the plurality of alternating reflective surfaces being constant, and wherein each different diffraction grating pattern of the successive series of different diffraction grating patterns has a different distance d between the plurality of alternating reflective surfaces;
   a means for detecting a reflection of the at least one intensity maxima from an object surface; and
   a means for determining a distance and a relative location of the object surface based on the reflection.

13. A method of electrically controlling a movement of an intensity maxima in a light detection and ranging (LIDAR) system, comprising:
   emitting a beam of light along a path;
   controlling a microelectromechanical system (MEMS) device comprising a plurality of electrically controllable reflective elements disposed in the path to generate a successive series of different diffraction grating patterns configured to move at least one intensity maxima to a corresponding successive series of locations across a field of view (FOV), wherein each different diffraction grating pattern of the successive series of different diffraction grating patterns comprises a plurality of alternating reflective surfaces and non-reflective surfaces, a distance d between the plurality of alternating reflective surfaces being constant, and wherein each different diffraction grating pattern of the successive series of different diffraction grating patterns has a different distance d between the plurality of alternating reflective surfaces;

detecting a reflection of the at least one intensity maxima from an object surface; and determining a distance and a relative location of the object surface based on the reflection.

* * * * *